(12) United States Patent
Kelley et al.

(10) Patent No.: US 7,402,042 B2
(45) Date of Patent: Jul. 22, 2008

(54) ELECTRONIC LEARNING DEVICE FOR AN INTERACTIVE MULTI-SENSORY READING SYSTEM

(75) Inventors: Miriam Kelley, Buffalo, NY (US); Scott H. McIlvain, Holland, NY (US); Matthew K. Brown, Sunnyside, NY (US)

(73) Assignee: Mattel, Inc., El Segundo, CA (US)

( * ) Notice: Subject to any disclaimer, the term of this patent is extended or adjusted under 35 U.S.C. 154(b) by 781 days.

(21) Appl. No.: 10/448,583

(22) Filed: May 30, 2003

(65) Prior Publication Data

US 2004/0043365 A1 Mar. 4, 2004

Related U.S. Application Data

(60) Provisional application No. 60/385,259, filed on May 31, 2002, provisional application No. 60/384,476, filed on May 31, 2002, provisional application No. 60/385,024, filed on May 31, 2002, provisional application No. 60/385,159, filed on May 30, 2002, provisional application No. 60/443,967, filed on Jan. 31, 2003.

(51) Int. Cl.
*G09B 17/00* (2006.01)
(52) U.S. Cl. .................. 434/178; 434/156; 434/167
(58) Field of Classification Search ................ 434/317, 434/319, 178; 412/1
See application file for complete search history.

(56) References Cited

U.S. PATENT DOCUMENTS

| | | | |
|---|---|---|---|
| 3,086,297 A | 4/1963 | Kay | |
| 3,172,215 A | 3/1965 | Ragen | |
| 3,529,832 A | 9/1970 | Goetz et al. | |
| 3,553,851 A | 1/1971 | Paige | |
| 3,605,285 A | 9/1971 | BenDaniel et al. | |
| 3,738,021 A | 6/1973 | Hino | |
| 3,795,989 A | 3/1974 | Greenberg et al. | |
| 3,798,370 A | 3/1974 | Hurst | |
| 3,823,814 A | 7/1974 | Lum | |
| 3,866,751 A | 2/1975 | Holert | |
| 3,911,215 A | 10/1975 | Hurst et al. | |

(Continued)

OTHER PUBLICATIONS

"Spelling B", "Texas Instruments, Inc.", 1978.

(Continued)

*Primary Examiner*—Robert E Pezzuto
*Assistant Examiner*—Banafsheh Hadizonooz
(74) *Attorney, Agent, or Firm*—Panitch Schwarze Belsario & Nadel LLP

(57) ABSTRACT

An electronic learning device configured to receive in a predetermined orientation a book having an arrangement of selectable mode icons, selectable content and a page identifier. Non-volatile memory in the electronic learning device has instructions associated with each mode icon, and data associated with the selectable content. A controller is in electrical communication with a page identification sensor and a position sensor for detecting the presence of a selector. The controller is configured a) to operate in accordance with instructions associated with each mode icon, b) to determine the position of the selector when the selector is within the active range of the position sensor, c) to recognize the page identifier, and a selection by the selector of one of the selectable mode icons, the selectable indicia or the selectable content and d) to send to the electronic user interface a signal associated with the selection.

68 Claims, 13 Drawing Sheets

U.S. PATENT DOCUMENTS

| | | |
|---|---|---|
| 4,220,815 A | 9/1980 | Gibson et al. |
| 4,355,984 A | 10/1982 | Slavik et al. |
| 4,357,489 A | 11/1982 | Henderson et al. |
| 4,380,007 A | 4/1983 | Steinegger |
| 4,395,058 A | 7/1983 | Terrell |
| 4,403,965 A | 9/1983 | Hawkins |
| 4,406,626 A | 9/1983 | Anderson et al. |
| 4,411,628 A | 10/1983 | Laughon et al. |
| 4,418,278 A | 11/1983 | Mondshein |
| 4,425,099 A | 1/1984 | Naden |
| 4,430,015 A | 2/1984 | Nerlinger |
| 4,514,817 A | 4/1985 | Pepper et al. |
| 4,516,260 A | 5/1985 | Breedlove et al. |
| 4,550,310 A | 10/1985 | Yamaguchi et al. |
| 4,556,871 A | 12/1985 | Yoshikawa et al. |
| 4,557,694 A | 12/1985 | Nelson |
| 4,561,002 A | 12/1985 | Chiu |
| 4,567,470 A | 1/1986 | Yoshikawa et al. |
| 4,571,454 A | 2/1986 | Tamaru et al. |
| 4,631,748 A | 12/1986 | Breedlove et al. |
| 4,636,881 A | 1/1987 | Brefka et al. |
| 4,686,332 A | 8/1987 | Greanias et al. |
| 4,703,573 A | 11/1987 | Montgomery et al. |
| 4,710,877 A | 12/1987 | Ahmed |
| 4,723,056 A | 2/1988 | Tamaru et al. |
| 4,749,353 A | 6/1988 | Breedlove |
| 4,752,230 A | 6/1988 | Shimizu |
| 4,766,368 A | 8/1988 | Cox |
| 4,778,391 A | 10/1988 | Weiner |
| 4,809,246 A | 2/1989 | Jeng |
| 4,818,827 A | 4/1989 | Ipcinski et al. |
| 4,820,233 A | 4/1989 | Weiner |
| 4,853,498 A | 8/1989 | Meadows et al. |
| 4,853,499 A | 8/1989 | Watson |
| 4,884,974 A | 12/1989 | DeSmet |
| 4,890,096 A | 12/1989 | Taguchi et al. |
| 4,913,463 A | 4/1990 | Tlapek et al. |
| 4,970,659 A | 11/1990 | Breedlove et al. |
| 4,990,092 A | 2/1991 | Cummings |
| 4,997,374 A | 3/1991 | Simone |
| 5,007,085 A | 4/1991 | Greanias et al. |
| 5,010,495 A | 4/1991 | Willetts |
| 5,022,522 A | 6/1991 | Kennedy |
| 5,088,928 A | 2/1992 | Chan |
| 5,113,178 A | 5/1992 | Yasuda et al. |
| 5,129,654 A | 7/1992 | Bogner |
| 5,166,679 A | 11/1992 | Vranish et al. |
| 5,167,508 A | 12/1992 | McTaggart |
| 5,174,759 A | 12/1992 | Preston et al. |
| 5,188,533 A | 2/1993 | Wood |
| 5,203,705 A | 4/1993 | Hardy et al. |
| 5,209,665 A | 5/1993 | Billings et al. |
| 5,220,136 A | 6/1993 | Kent |
| 5,226,822 A | 7/1993 | Morris |
| 5,257,431 A | 11/1993 | Larson et al. |
| 5,263,865 A | 11/1993 | Zipf |
| 5,290,190 A | 3/1994 | McClanahan |
| 5,302,132 A | 4/1994 | Corder |
| 5,305,017 A | 4/1994 | Gerpheide |
| 5,356,296 A | 10/1994 | Pierce et al. |
| 5,363,051 A | 11/1994 | Jenstrom et al. |
| 5,364,272 A | 11/1994 | Herman et al. |
| 5,365,434 A | 11/1994 | Figliuzzi |
| 5,374,195 A | 12/1994 | McClanahan |
| 5,374,787 A | 12/1994 | Miller et al. |
| 5,397,890 A | 3/1995 | Schueler et al. |
| 5,404,444 A | 4/1995 | Billings |
| 5,413,355 A | 5/1995 | Gonzalez |
| 5,413,486 A | 5/1995 | Burrows et al. |
| 5,417,575 A | 5/1995 | McTaggart |
| 5,418,551 A | 5/1995 | Ise |
| 5,419,705 A | 5/1995 | Sandvik |
| 5,429,513 A | 7/1995 | Diaz-Plaza |
| 5,433,614 A | 7/1995 | Beye |
| 5,437,552 A | 8/1995 | Baer et al. |
| 5,463,388 A | 10/1995 | Boie |
| 5,466,158 A | 11/1995 | Smith |
| 5,474,457 A | 12/1995 | Bromley |
| 5,484,292 A | 1/1996 | McTaggart |
| 5,485,176 A | 1/1996 | Ohara et al. |
| 5,508,700 A | 4/1996 | Taylor et al. |
| 5,511,980 A | 4/1996 | Wood |
| 5,517,407 A | 5/1996 | Weiner |
| 5,531,600 A * | 7/1996 | Baer et al. .................. 434/317 |
| 5,538,430 A | 7/1996 | Smith et al. |
| 5,539,292 A | 7/1996 | Vranish |
| 5,565,658 A | 10/1996 | Gerpheide et al. |
| 5,569,868 A | 10/1996 | Leung |
| 5,572,769 A | 11/1996 | Spechts et al. |
| 5,575,659 A | 11/1996 | King et al. |
| 5,604,517 A | 2/1997 | Filo |
| 5,631,883 A | 5/1997 | Li |
| 5,636,995 A | 6/1997 | Sharpe, III et al. |
| 5,645,432 A | 7/1997 | Jessop |
| 5,648,642 A | 7/1997 | Miller et al. |
| 5,650,597 A | 7/1997 | Redmayne |
| 5,651,044 A | 7/1997 | Klotz et al. |
| 5,686,705 A | 11/1997 | Conroy et al. |
| 5,694,653 A | 12/1997 | Harald |
| 5,697,793 A | 12/1997 | Huffman et al. |
| 5,707,240 A | 1/1998 | Haas et al. |
| 5,717,938 A | 2/1998 | Garthwaite et al. |
| 5,722,686 A | 3/1998 | Blackburn et al. |
| 5,739,814 A | 4/1998 | Ohara et al. |
| 5,749,735 A | 5/1998 | Redford et al. |
| 5,774,109 A | 6/1998 | Winksy et al. |
| 5,795,213 A | 8/1998 | Goodwin |
| 5,799,267 A | 8/1998 | Siegel |
| 5,801,340 A | 9/1998 | Peter |
| 5,810,599 A | 9/1998 | Bishop |
| 5,810,604 A | 9/1998 | Kopp, Jr. et al. |
| 5,813,861 A | 9/1998 | Wood |
| 5,823,782 A | 10/1998 | Marcus et al. |
| 5,825,352 A | 10/1998 | Bisset et al. |
| 5,829,985 A | 11/1998 | Campanella |
| 5,836,771 A | 11/1998 | Ho et al. |
| 5,839,902 A | 11/1998 | Wood |
| 5,841,078 A | 11/1998 | Miller et al. |
| 5,861,583 A | 1/1999 | Schediwy et al. |
| 5,865,677 A | 2/1999 | Goldfarb et al. |
| 5,877,458 A | 3/1999 | Flowers |
| 5,881,434 A | 3/1999 | Rigney |
| 5,889,236 A | 3/1999 | Gillespie et al. |
| 5,893,132 A | 4/1999 | Huffman et al. |
| 5,897,324 A | 4/1999 | Tan |
| 5,902,112 A | 5/1999 | Mangold |
| 5,902,116 A | 5/1999 | Rieber |
| 5,910,009 A | 6/1999 | Leff et al. |
| 5,914,465 A | 6/1999 | Allen et al. |
| 5,914,706 A | 6/1999 | Kono |
| 5,920,309 A | 7/1999 | Bisset et al. |
| 5,923,101 A | 7/1999 | Peterson et al. |
| 5,932,863 A | 8/1999 | Rathus et al. |
| 5,933,288 A | 8/1999 | Plesko |
| 5,944,533 A | 8/1999 | Wood |
| 5,944,574 A | 8/1999 | Small et al. |
| 5,946,083 A | 8/1999 | Melendez et al. |
| 5,951,298 A | 9/1999 | Werzberger |
| 5,954,514 A | 9/1999 | Haas et al. |
| 5,954,515 A | 9/1999 | Iggulden |
| 5,957,697 A | 9/1999 | Iggulden et al. |
| 5,973,318 A | 10/1999 | Plesko |
| 5,997,304 A | 12/1999 | Wood |
| 6,009,397 A | 12/1999 | Siegel |

| | | | |
|---|---|---|---|
| 6,010,405 A | 1/2000 | Morawiec | |
| 6,017,219 A | 1/2000 | Adams et al. | |
| 6,041,215 A | 3/2000 | Maddrell et al. | |
| 6,053,741 A | 4/2000 | Wood | |
| 6,064,855 A * | 5/2000 | Ho | 434/317 |
| 6,067,026 A | 5/2000 | Weimer et al. | |
| 6,072,980 A | 6/2000 | Manico et al. | |
| 6,077,085 A | 6/2000 | Parry et al. | |
| 6,079,748 A | 6/2000 | Kaufman | |
| 6,089,943 A | 7/2000 | Lo | |
| 6,094,610 A | 7/2000 | Steffens, Jr. et al. | |
| 6,101,367 A | 8/2000 | Luciano | |
| 6,120,297 A | 9/2000 | Morse et al. | |
| 6,124,851 A | 9/2000 | Jacobson | |
| 6,134,529 A | 10/2000 | Rothenberg | |
| 6,142,784 A | 11/2000 | Wood | |
| 6,148,173 A | 11/2000 | Bell | |
| 6,154,214 A | 11/2000 | Uyehara et al. | |
| 6,190,174 B1 | 2/2001 | Lam | |
| 6,201,947 B1 | 3/2001 | Hur | |
| 6,222,528 B1 | 4/2001 | Gerpheide et al. | |
| 6,239,389 B1 | 5/2001 | Allen et al. | |
| 6,241,527 B1 | 6/2001 | Rast | |
| 6,262,717 B1 | 7/2001 | Donohue et al. | |
| 6,269,238 B1 | 7/2001 | Iggulden | |
| 6,327,459 B2 | 12/2001 | Redford et al. | |
| 6,330,427 B1 | 12/2001 | Tabachnik | |
| 6,333,736 B1 | 12/2001 | Sandbach | |
| 6,343,935 B1 | 2/2002 | Clements | |
| 6,347,813 B1 | 2/2002 | Star et al. | |
| 6,356,287 B1 | 3/2002 | Ruberry et al. | |
| 6,364,666 B1 | 4/2002 | Jenkins et al. | |
| 6,405,167 B1 | 6/2002 | Cogliano | |
| 6,416,326 B1 | 7/2002 | Oh | |
| 6,434,518 B1 | 8/2002 | Glenn | |
| 6,463,257 B1 | 10/2002 | Wood | |
| 6,491,220 B1 | 12/2002 | May | |
| 6,512,497 B1 | 1/2003 | Kondo et al. | |
| 6,608,618 B2 | 8/2003 | Wood et al. | |
| 6,641,401 B2 | 11/2003 | Wood et al. | |
| 6,661,405 B1 | 12/2003 | Flowers | |
| 6,668,156 B2 * | 12/2003 | Lynch et al. | 434/317 |
| D487,118 S | 2/2004 | Elias | |
| D489,367 S | 5/2004 | Lynch et al. | |
| 6,750,978 B1 | 6/2004 | Marggraff et al. | |
| D492,679 S | 7/2004 | Avery | |
| D492,680 S | 7/2004 | Avery | |
| D493,495 S | 7/2004 | Avery | |
| 6,763,995 B1 * | 7/2004 | Song | 434/317 |
| D493,787 S | 8/2004 | Avery | |
| 2001/0021339 A1 * | 9/2001 | Pacione | 412/1 |
| 2001/0051329 A1 | 12/2001 | Lynch et al. | |
| 2002/0030638 A1 | 3/2002 | Weiner | |
| 2002/0054372 A1 | 5/2002 | Takahashi | |
| 2002/0076683 A1 | 6/2002 | Chen | |
| 2002/0081560 A1 | 6/2002 | Ka-wah et al. | |
| 2002/0090596 A1 | 7/2002 | Sosoka et al. | |
| 2002/0197589 A1 | 12/2002 | Wood et al. | |
| 2003/0016210 A1 | 1/2003 | Soto et al. | |
| 2003/0059757 A1 | 3/2003 | Wood | |
| 2003/0077558 A1 | 4/2003 | Wood et al. | |
| 2003/0116620 A1 | 6/2003 | Song | |
| 2003/0129572 A1 | 7/2003 | Shuler et al. | |
| 2003/0129576 A1 | 7/2003 | Wood et al. | |
| 2003/0139113 A1 | 7/2003 | Wood et al. | |
| 2003/0162162 A1 | 8/2003 | Marggraff | |
| 2003/0175672 A1 | 9/2003 | Kim et al. | |
| 2003/0218604 A1 | 11/2003 | Wood et al. | |
| 2004/0032369 A1 | 2/2004 | Flowers | |
| 2004/0104890 A1 | 6/2004 | Caldwell et al. | |
| 2004/0219501 A1 * | 11/2004 | Small et al. | 434/317 |

OTHER PUBLICATIONS

"Spelling B Book", "Texas Instruments, Inc.", 1978.
"Speakspell", "Texas Instruments, Inc.", 1980.
Staff of TI Learning Center, "Fun With Words", "Texas Instruments, Inc.", 1980.
Frantz, Gene A. et al., "Design Case History: Speak & Spell Learns to Talk", "Texas Instruments, Inc.", Feb. 1982.
Bridgeman, Brent et al.,, "Computer Vocabulary Tutor", "The Institute of Electrical and Electronics Engineers, Inc.", Oct. 1983.
"TI Speak & Read Educational Product—A Dog on a Log Cartridge (Parent's Guide)", Texas Instruments, Inc., 1984.
Bookman, Myra O., "Spelling as a Cognitive-Developmental Linguistic, Process", "N/A", Sep. 1984.
Bridgeman, Brent et al., "Development of a Hand-Held Computerized Vocabulary Tutor", "Educational Testing Service and U.S. Army Research Institute for the Behavioral and Social Sciences, respectively", 1985.
Alessi, Stephen M. et al., "Computer-Based Instruction—Methods and Development", "University of Iowa and University of Minnesota, respectively", 1985.
"My Talking Computer—Complete Learn-For-Fun System", "Coleco Play and Learn Electronics", 1986.
"Electronic Teach Me Reader—A Complete Learning Program That Teaches Your Child to Read", "Playskool, Inc.", 1986.
"Texas Instruments Educational Products", "N/A", 1987.
Macarthur, Charles A. et al., "Computer Assisted Instruction With Learning Disabled Students: Achievement, Engagement, and Other Factors That Influence Achievement", "University of Maryland, Dept. of Special Education", 1990.
"My Talking Storybook—Parent's Guide", "Tiger Electronics, Inc.", 1990.
"Give Your Child a Super Advantage in Reading", "Texas Instruments Incorporated", 1990.
"Reading Library I and Reading Library II for the Super Speak & Read", "Texas Instruments Incorporated", 1990.
"Super Speak & Read—A Parent's Instruction and Operation Guide", "Texas Instruments Incorporated", 1990.
"PICO—The Computer That Thinks It's a Toy!—User's Manual", "Sega", 1994.
"PICO Storyware", "Sega", 1995.
"The Lion King—Adventures at Pride Rock", "Sega", 1995.

* cited by examiner

| Die Strike Code | ED1 | ED2 | ED3 | ED4 | ED5 | ED6 | ED7 | ED8 | ED9 | ED10 | ED11 | ED12 | ED13 | ED14 |
|---|---|---|---|---|---|---|---|---|---|---|---|---|---|---|
| 00 | – | – | – | – | – | – | – | – | – | – | – | – | – | – |
| 01 | C | O | O | O | O | O | O | O | O | O | O | O | O | F |
| 02 | C | C | O | O | O | O | O | O | O | O | O | O | F | C |
| 03 | C | C | C | O | O | O | O | O | O | O | O | F | C | C |
| 04 | C | C | C | C | O | O | O | O | O | O | F | C | C | C |
| 05 | C | C | C | C | C | O | O | O | O | F | C | C | C | C |
| 06 | C | C | C | C | C | C | O | O | F | C | C | C | C | C |
| 07 | C | C | C | C | C | C | C | F | O | O | O | O | O | O |
| 08 | C | C | C | C | C | C | F | O | O | O | O | O | O | O |
| 09 | C | C | C | C | C | F | O | O | O | O | O | O | O | O |
| 10 | C | C | C | C | F | O | O | O | O | O | O | O | O | O |
| 11 | C | C | C | F | O | O | O | O | O | O | O | O | O | O |
| 12 | C | C | F | O | O | O | O | O | O | O | O | O | O | O |
| 13 | C | F | O | O | O | O | O | O | O | O | O | O | O | O |
| 14 | F | O | O | O | O | O | O | O | O | O | O | O | O | O |
| 15 | – | – | – | – | – | – | – | – | – | – | – | – | – | – |
| 16 | – | – | – | – | – | – | – | – | – | – | – | – | – | – |
| 17 | C | O | O | O | C | C | C | C | C | C | C | O | O | O |
| 18 | C | C | C | C | C | C | C | C | C | C | C | C | F | O |
| 19 | C | C | F | C | C | C | C | C | C | C | C | O | F | C |
| 20 | C | F | O | C | C | C | C | C | C | C | C | O | O | O |

KEY:
- ED = Emitter Detector Pair
- O = Hole Open in page
- C = Hole Closed in page
- F = Foil pad to cover open hole
- – = Irrelevant. Page not present.

NOTE: On the front and back covers, all unpunched holes have foil.

Fig. 14

| Spread Code | Left Page ||||||| Right Page |||||||
|---|---|---|---|---|---|---|---|---|---|---|---|---|---|---|
| | ED1 | ED2 | ED3 | ED4 | ED5 | ED6 | ED7 | ED8 | ED9 | ED10 | ED11 | ED12 | ED13 | ED14 |
| 00 | O | O | O | O | O | O | O | C | C | C | C | C | C | C |
| 01 | C | O | O | O | O | O | O | C | C | C | C | C | C | C |
| 02 | C | C | C | O | O | O | O | C | C | C | C | C | C | C |
| 03 | C | C | C | C | O | O | O | C | C | C | C | C | C | C |
| 04 | C | C | C | C | C | O | O | C | C | C | C | C | C | C |
| 05 | C | C | C | C | C | C | O | C | C | C | C | C | C | C |
| 06 | C | C | C | C | C | C | C | C | C | C | C | C | C | C |
| 07 | C | C | C | C | C | C | C | O | C | C | C | C | C | C |
| 08 | C | C | C | C | C | C | C | O | O | C | C | C | C | C |
| 09 | C | C | C | C | C | C | C | O | O | O | C | C | C | C |
| 10 | C | C | C | C | C | C | C | O | O | O | O | C | C | C |
| 11 | C | C | C | O | C | C | C | C | O | O | O | O | C | C |
| 12 | O | O | O | O | C | C | C | C | C | O | O | O | O | C |
| 13 | C | O | O | O | C | C | C | C | C | C | O | O | O | O |
| 14 | O | O | O | O | O | C | C | C | C | C | C | O | O | O |
| 15 | O | C | C | C | C | C | C | C | C | C | C | C | O | C |
| 16 | C | C | C | C | C | C | C | C | C | C | C | C | C | C |
| 17 | C | C | C | C | C | C | C | C | C | C | C | C | C | C |
| 18 | C | C | C | C | C | C | C | C | C | C | C | C | C | C |
| 19 | C | C | C | C | C | C | C | C | C | C | C | C | C | C |
| 20 | C | C | C | C | C | C | C | C | C | C | C | O | O | O |

KEY:  ED = Emitter/Detector pair
O = Hole Open, Voltage below threshold
C = Hole Closed, Voltage above threshold

*Fig. 15*

ELECTRONIC LEARNING DEVICE FOR AN INTERACTIVE MULTI-SENSORY READING SYSTEM

CROSS-REFERENCE TO RELATED APPLICATIONS

This application is related to U.S. Provisional Patent Application No. 60/385,259 filed May 31, 2002 and entitled "Case for Interactive Multi-Sensor Reading System", U.S. Provisional Patent Application No. 60/384,476 filed May 31, 2002 and entitled "Spiral Binding Attachment Clip", U.S. Provisional Patent Application No. 60/385,024 filed May 31, 2002 and entitled "Method for Teaching Linguistics", U.S. Provisional Application No. 60/385,159 filed May 30, 2002 and entitled "Interactive Book-Reading Device with Intelligent Finger-Touch Sensor", and U.S. Provisional Patent Application No. 60/443,967 filed Jan. 31, 2003 and entitled "Optical Page Identification System", and claims the earlier filing dates of the related applications, each of which is incorporated herein by reference.

BACKGROUND OF THE INVENTION

The present invention relates to an electronic learning device for an interactive multi-sensory reading system. More particularly, the present invention relates to an electronic learning device that is configured as a folding book and that allows a child to activate electronic speech, sound and lights by selecting words or images on the covers and pages of multi-page books removably insertable in a book recess area of the electronic learning device.

The typical electronic learning system comprises one or more books each of which has at least one area of selectable content, non-volatile memory having stored therein material associated with the selectable content, a sensor for identifying a specific selection made from the selectable content and a reader configured to produce an output based on the stored material in response to the selection. The selectable content can include letters, words, graphics and the like. The sensor for selecting the content is typically a stylus or a pressure sensitive switch underlying the selection and the output associated with the selection is typically an audio signal.

Typical interactive, electronic learning systems allow a child to activate electronic speech, sound and lights by pointing to words or images on the cover and pages of multi-page books. The principle components of the typical system are a hinged, book-like folding base unit housing system electronics, a library of books removably mountable in a book well in the base unit, and read only memory ("ROM") within the base unit or within cartridges removably insertable in the base unit having stored therein software associated with the content of the books.

The conventional hardware for the implementing the aforementioned systems is generally not user friendly as a hard-wired stylus or difficult to press pressure sensitive switches are required to identify the page being viewed and to select the interactive content on the viewed page. Accordingly, the conventional hardware usually requires an unreasonable amount of assistance and instruction before a child can knowledgeably and properly use the system. For example, to identify a currently viewable page or to detect a page turn or to select an interactive content, a child is typically instructed to touch with a stylus a uniquely positioned page identification icon, such as a graphic having a particular geometric shape or an easily recognizable key word such as the word "Go" and then the desired object of interest on the page. The systems are error prone due to the positional certainty with which the pages of the book must be placed on the reader. The systems are also error prone due to user behavioral issues such as failure to select the page identification icon before interacting with a page or the turning of multiple pages at once or the partial turning of a page or the difficulty of manipulating a stylus. Accordingly, current methods for page identification and synchronization and selection of objects of interest on a page employed by conventional learning systems result in a large percentage of synchronization and selection errors.

A user friendly base unit designed for an easy to use electronic learning system, and more particularly for autonomous page identification and finger-based content selection, will significantly increase the value of conventional electronic reading aids and, through fun and engaging play, more enjoyably assist a child in developing literacy skills.

BRIEF SUMMARY OF THE INVENTION

Briefly stated, one aspect of the present invention is related to an interactive electronic learning device for receiving a book associated with an interactive electronic learning system responsive to a selector. The book has a predetermined orientation and selectable content. The device comprises a housing assembly having a book well configured to receive the book when the book is in the predetermined orientation. An electronic user interface is in the housing assembly. The electronic user interface comprises a position sensor having an active range including the selectable content of the book when the book is in the book well. Control electronics are in the housing assembly. The control electronics comprise non-volatile memory having therein instructions associated with the selectable content and a controller in electrical communication with the electronic user interface. The controller is configured (a) to operate in accordance with the instructions in the non-volatile memory, (b) to determine a position of the selector when the selector is within the active range of the position sensor, (c) to recognize a selection of the selectable content by the selector, and (d) to send to the electronic user interface a signal associated with the selection.

Another aspect of the present invention is an interactive electronic learning device for receiving a book associated with an interactive electronic learning system responsive to a selector. The book is openable to a two-page spread formed by a first page and a second page connected to the first page by a binding. The two-page spread has selectable content thereon and opposed side edges distal to the binding. Each of the opposed side edges has a setback upper portion. The device comprises a housing assembly having a book well with sidewalls generally conforming to the two-page spread. A portion of each sidewall is in registry with the setback upper portion of the two-page spread and has a sidewall setback configured, in conjunction with the setback upper portion, to facilitate access for page turning. An electronic user interface is in the housing assembly. The electronic user interface comprises a position sensor having an active range including the selectable content of the book when the book is in the book well. Control electronics are in the housing assembly. The control electronics comprises non-volatile memory having therein instructions associated with the selectable content and a controller in electrical communication with the electronic user interface. The controller is configured (a) to operate in accordance with the instructions in the non-volatile memory, (b) to determine a position of the selector when the selector is within the active range of the position sensor, (c) to recognize a selection of the selectable content by the selector, and (d) to send to the electronic user interface a signal associated with the selection.

Another aspect of the present invention is an interactive electronic learning system for receiving a book associated with an interactive electronic learning system responsive to a selector. The book is openable to a two-page spread formed by a first page and a second page connected to the first page by a binding. The two-page spread has a page spread bottom portion with a page-spread bottom edge. The device comprises a housing assembly having a book well with sidewalls generally conforming to the two-page spread. A portion of each sidewall in registry with the page-spread bottom edge has a bevel configured to provide unobstructed tactual and visual access to the page-spread bottom portion. An electronic user interface is in the housing assembly. The electronic user interface comprises a position sensor having an active range including the selectable content of the book when the book is in the book well. Control electronics are in the housing assembly. The control electronics comprises non-volatile memory having therein instructions associated with the selectable content and a controller in electrical communication with the electronic user interface. The controller is configured (a) to operate in accordance with the instructions in the non-volatile memory, (b) to determine a position of the selector when the selector is within the active range of the position sensor, (c) to recognize a selection of the selectable content by the selector, and (d) to send to the electronic user interface a signal associated with the selection.

Another aspect of the present invention is an interactive electronic learning device for receiving a book associated with an interactive electronic learning system responsive to a selector. The book has selectable content. The device comprises a housing assembly having a base with a base-recess and a cover with a cover-recess. The base-recess and the cover-recess form a book well. A hinge assembly connects the base to the cover. The hinge assembly comprises a first hinge and a second hinge spaced from the first hinge. The first and second hinges have an axis of rotation spaced from the base-recess edge and the cover-recess edge. A book mounting assembly has a first mounting element integral with the first hinge and a second mounting element integral with the second hinge. The first and second mounting elements are configured to releasably retain the book in the book well. An electronic user interface is in the housing assembly. The electronic user interface comprises a position sensor having an active range including the selectable content of the book when the book is in the book well. Control electronics are in the housing assembly. The control electronics comprise non-volatile memory having therein instructions associated with the selectable content and a controller in electrical communication with the electronic user interface. The controller is configured (a) to operate in accordance with the instructions in the non-volatile memory, (b) to determine a position of the selector when the selector is within the active range of the position sensor, (c) to recognize a selection of the selectable content by the selector, and (d) to send to the electronic user interface a signal associated with the selection.

Another aspect of the present invention is an interactive electronic device for receiving a book associated with an interactive electronic learning system responsive to a selector. The book has selectable content. The device comprises a housing assembly having a book well configured to receive the book. A physical user interface is in the book well. The physical interface comprises an arrangement of selectable indicia. An electronic user interface is in the housing assembly. The electronic user interface comprises a position sensor having an active range including the selectable content of the book when the book is in the book well and the selectable indicia of the book well. Control electronics are in the housing assembly. The control electronics comprise non-volatile memory having therein instructions associated with the selectable content of the book and the selectable indicia of the book well and a controller in electrical communication with the electronic user interface. The controller is configured (a) to operate in accordance with the instructions in the non-volatile memory, (b) to determine a position of the selector when the selector is within the active range of the position sensor, (c) to recognize a selection by the selector of the selectable content of the book or one of the selectable indicia of the book well, and (d) to send to the electronic user interface a signal associated with the selection.

Another aspect of the present invention is an interactive electronic device for receiving a book associated with an interactive electronic learning system responsive to a selector. The device comprises a housing assembly having a book well configured to receive the book. A physical user interface is in the book well. The physical user interface comprises an arrangement of selectable mode icons. An electronic user interface is in the housing assembly. The electronic user interface comprises a position sensor having an active range including the selectable mode icons of the book well. Control electronics are in the housing assembly. The control electronics comprise non-volatile memory having therein instructions associated with the selectable mode icons in the book well and a controller in electrical communication with the electronic user interface. The controller is configured (a) to operate in accordance with the instructions associated with the selectable mode icon in the book well, (b) to determine a position of the selector when the selector is within the active range of the position sensor, (c) to recognize a selection by the selector of one of the selectable mode icons in the book well, and (d) to send to the electronic user interface a signal associated with the selection.

Another aspect of the present invention is an interactive electronic device for receiving a book associated with an interactive electronic learning system responsive to a selector. The book has selectable content and an arrangement of selectable mode icons. The device comprises a housing assembly having a book well configured to receive the book. An electronic user interface is in the housing assembly. The electronic user interface comprises a position sensor and a visible signal generator. The position sensor has an active range including the selectable content and the arrangement of selectable mode icons when the book is in the book well. The visible signal generator is in registry with the selectable mode icons of the book when the book is in the book well. Control electronics are in the housing assembly. The control electronics comprise non-volatile memory having therein instructions associated with the selectable content and the selectable mode icons and a controller in electrical communication with the electronic user interface. The controller is configured (a) to operate in accordance with the instructions in the non-volatile memory, (b) to determine a position of the selector when the selector is within the active range of the position sensor, (c) to recognize a first selection by the selector of one of the selectable mode icons and send to the visible signal generator a first signal corresponding to the first selection, and (d) to recognize a second selection by the selector of the selectable content and send to the electronic user interface a signal associated with the second selection.

Another aspect of the present invention is an interactive electronic device for receiving a book associated with an interactive electronic learning system responsive to a selector.

The book has a page identifier and selectable content. The device comprises a housing assembly having a book well configured to receive the book. An electronic user interface is in the housing assembly. The electronic user interface comprises a position sensor having an active range including the selectable content of the book when the book is in the book well. A page identification sensor is in the housing assembly. Control electronics are in the housing assembly. The control electronics comprise non-volatile memory having therein instructions associated with the selectable content and a controller in electrical communication with the electronic user interface and the page identification sensor. The controller is configured (a) to operate in accordance with the instructions in the non-volatile memory, (b) to determine a position of the selector when the selector is within the active range of the position sensor, (c) to recognize the page identifier, (d) to recognize a selection of the selectable content by the selector, and (e) to send to the electronic user interface a signal associated with the selection.

Another aspect of the present invention is an interactive electronic learning device for receiving a book associated with an interactive electronic learning system responsive to a selector. The book has a predetermined orientation and a two-page spread formed by a first page and a second page connected to the first page by a binding attached to a spine. The two-page spread has opposed side edges distal to the binding. Each of the opposed side edges has a setback upper portion, a page identifier, and selectable content. A first arrangement of selectable mode icons is on the two-page spread. The device comprises a housing assembly having a base with a base-recess and a cover with a cover-recess. A hinge assembly connects the base to the cover. The hinge assembly comprises a first hinge and a second hinge spaced from the first hinge. The first and second hinges have an axis of rotation spaced from the base-recess edge and the cover-recess edge. A book well is formed by the base-recess and the cover-recess. The book well, has sidewalls generally conforming to the two-page spread. The sidewalls are configured to receive the book when the book is in the predetermined orientation. A portion of each sidewall in registry with the setback upper portion of the two-page spread has a sidewall offset configured, in conjunction with the setback upper portion of the two-page spread, to facilitate access for page turning. A book mounting assembly has a first mounting element integral with the first hinge and a second mounting element integral with the second hinge. The first and second mounting elements are configured to releasably retain the book in the book well. A physical user interface is in the book well. The physical interface comprises a second arrangement of selectable mode icons and an arrangement of selectable indicia. An electronic user interface is in the housing assembly. The electronic user interface comprises a position sensor and an arrangement of light emitting diodes. The position sensor has an active range including the selectable content of the book when the book is in the book well. Each of the selectable mode icons is in registry with a light emitting diode of the arrangement of light emitting diodes. A page identification sensor is in the housing assembly. Control electronics are in the housing assembly. The control electronics comprise non-volatile memory having therein instructions associated with each of the selectable mode icons of the first and second arrangements of selectable mode icons and data associated with the selectable indicia and the selectable content and a controller in electrical communication with the electronic user interface, the position sensor, and the page identification sensor. The controller is configured (a) to operate in accordance with the instructions in the non-volatile memory, (b) to determine a position of the selector when the selector is within the active range of the position sensor, (c) to recognize the page identifier, (d) to recognize a first selection by the selector of one of the selectable mode icons of the first and second arrangements of selectable mode icons and to energize the light emitting diode in registry with the first selection, and (e) to recognize a second selection by the selector of the selectable content of the book or the selectable indicia of the book well and send to the electronic user interface a signal associated with the second selection.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 14 is a table of the die strike codes for the page identifiers for the two-page spreads for the book of FIG. 12;

FIG. 15 is a table of the spread codes for the page identifiers for the two-page spreads for a book of FIG. 12;

DETAILED DESCRIPTION OF THE INVENTION

Figure 1:
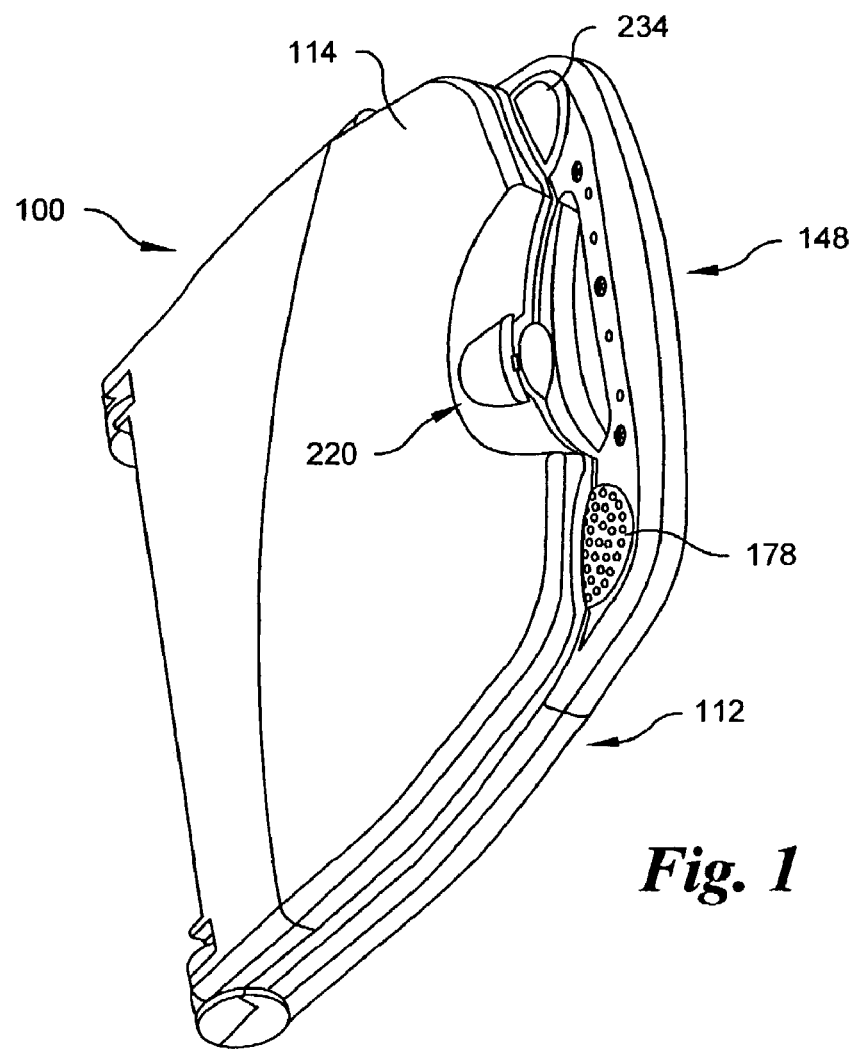
FIG. 1 is a top perspective view of a preferred embodiment of present invention showing an electronic learning device in the closed position.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of electronic learning device and designated parts thereof. The terminology includes the words noted above, derivatives thereof and words of similar import.

Additionally, as used in the claims and the corresponding portions of the specification, the word "a" means "at least one". Further, the word "or" has the meaning of a Boolean inclusive "Or". For example, the phrase "A or B" means "A" alone or "B" alone or both "A" and "B". The term "connected" as used in the claims and in corresponding portions of the specification means that there exists between any two or more elements a structural path, which may include additional elements not explicitly recited.

Referring to FIGS. 1-11, there is shown a first preferred embodiment of the electronic learning device, generally designated 100, and hereinafter referred to as the "electronic learning device" 100 in accordance with the present invention. The electronic learning device 100 is for receiving a book 10 associated with an interactive electronic learning system responsive to a selector (not shown). The electronic learning device also is configured for use without a book 10 as further discussed below.

The book 10, for preferable use with the electronic learning device 100, is the subject of a co-pending U.S. patent application filed by the assignee of the present application. The co-pending application is entitled "Book/Clipped Container Combination", Ser. No. 10/448,593 (Pub. No. 2004007010192 A1), filed May 30, 2003 and is incorporated herein by reference. Accordingly, only the features of the book 10 pertinent to an understanding of the electronic learning device 100 are briefly summarized in this disclosure.

Figure 3:
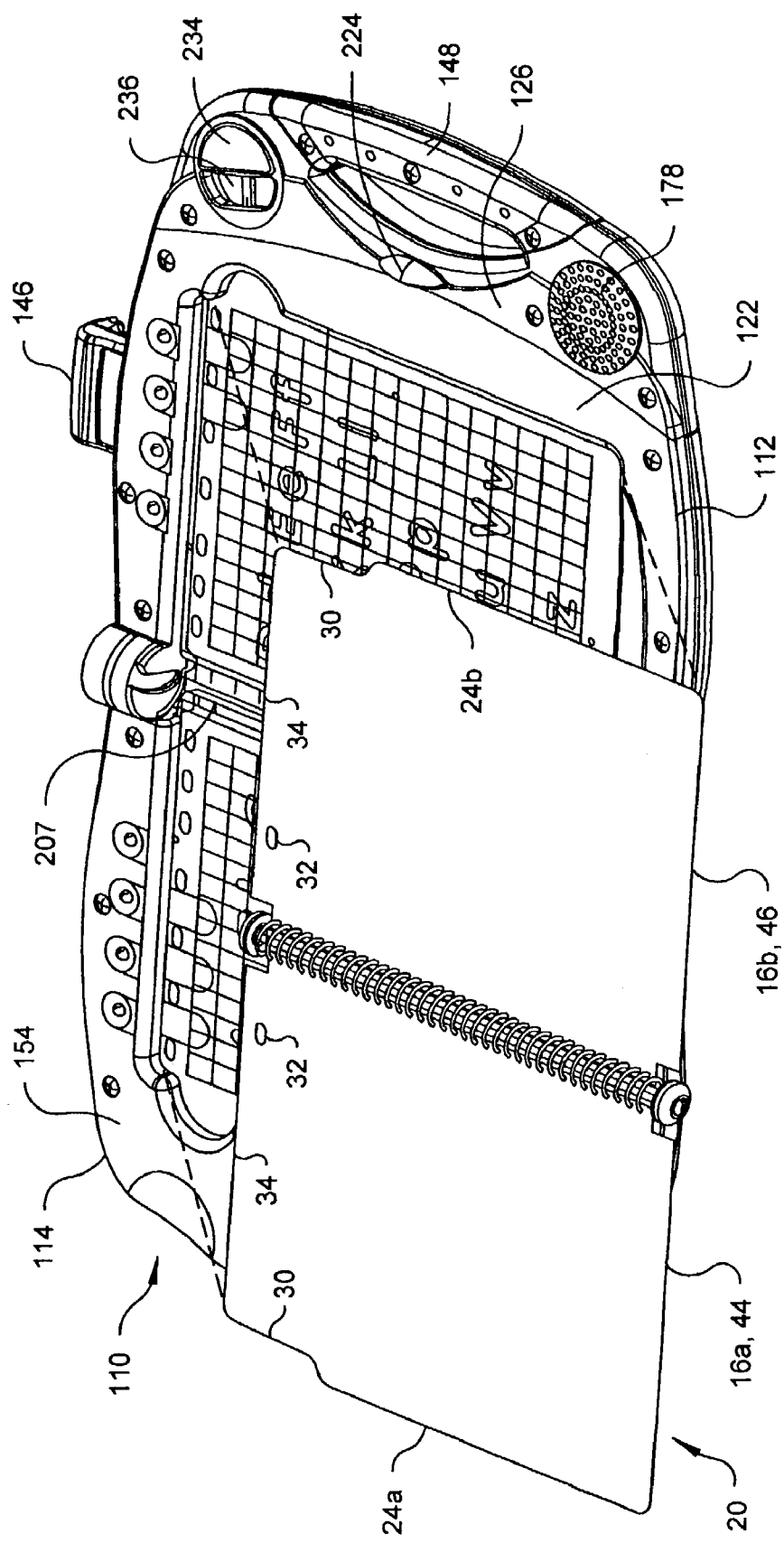
FIG. 3 is a top perspective view of the electronic learning device in FIG. 1 partially overlaid with a book open to a two-page spread.
Figure 12:
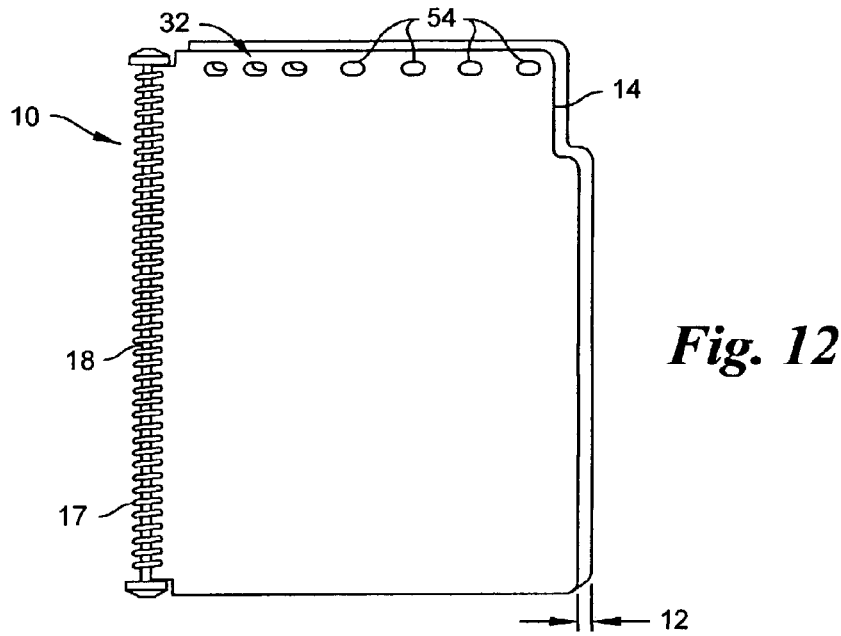
FIG. 12 is a elevation view of the cover of a book for use with the electronic learning device in FIG. 1.
Figure 13:
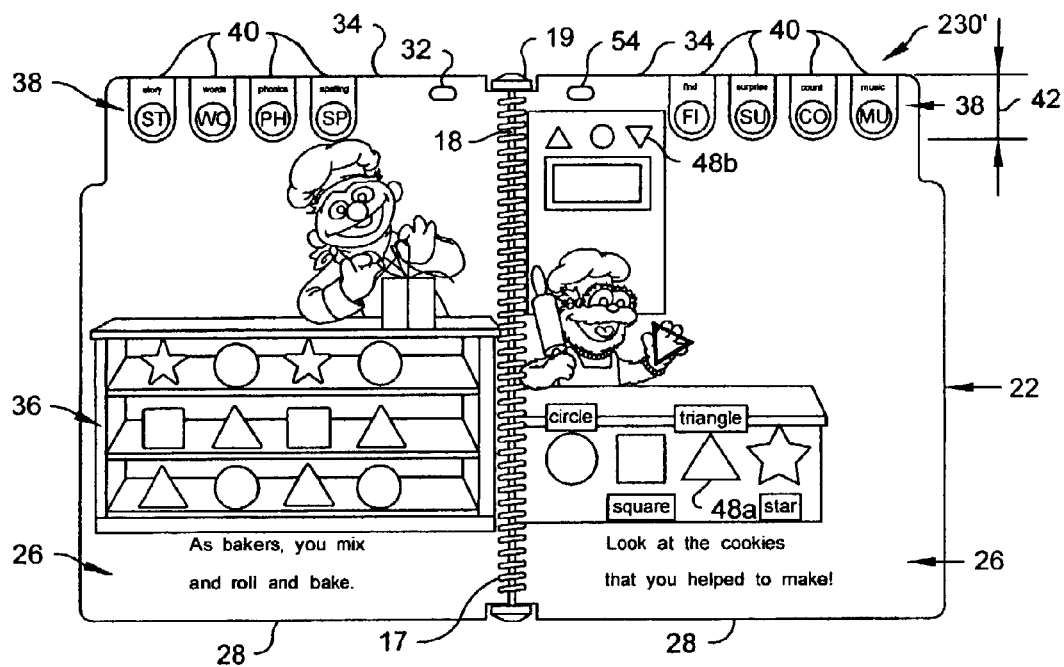
FIG. 13 is atop plan view of a page-spread layout for the book of FIG. 12.

Referring to FIGS. 3, 8, 12-13, and 15-16, the book 10 has a thickness 12 and at least one setback 14 and comprises a plurality of pages, such as a first page 16a and a second page 16b, connected by a binding 17 attached to the spine 18 having end caps 19 rotatably attached thereto. Any pair of the plurality of pages, like first and second pages 16a, 16b, open into a two-page spread 20 having a page-spread layout 22 discussed below. The two-page spread 20 has opposed side edges 24a, 24b distal to the binding 17 and a page-spread bottom portion 26 with a page-spread bottom edge 28. The end caps 19 of the spine 18 oppose movement of the first and second pages 16a, 16b radially inwardly toward the spine 18. The opposed side edges 24a, 24b have a setback upper portion 30 having substantially the same configuration as the at least one setback 14 of the book 10. Both the book 10 and the two-page spread 20 have a predetermined orientation as shown in FIGS. 3, and 12-13. Preferably, the predetermined orientation is the normal orientation for reading content in a typical book. Accordingly, in the preferred orientation, the book 10 and the two-page spread 20 are positioned in the electronic learning device 100 such that the at least one setback 14 of the book 10 and the setback upper portions 30 are in the outer upper right and left portions of the electronic learning device 100. Preferably, the at least one setback 14 of the book 10 and the setback upper portions 30 of the opposed side edges 24a, 24b of the two-page spread 20 have a beveled lower portion configured to conform to and receive the tip of a user's finger. The two-page spread 20 has a page identifier 32 positioned proximal to the page-spread upper edge 34 for registry with and detection by a page identification sensor in the electronic learning device 100 discussed below.

Referring to FIGS. 1-11, the electronic learning device 100 has a housing assembly 110 configured to receive the book 10 when the book is in the predetermined orientation. The housing assembly 110 comprises a base 112, a cover 114, a hinge assembly 116 and a book mounting assembly 118. Preferably, both the base 112 and the cover 114 are molded from a polymeric material. However, the base outer 112 and the cover 114 may also be made from other materials. Alternative methods of manufacture such as machining or casting may be used to make the base 112 and cover 114.

Figure 4:
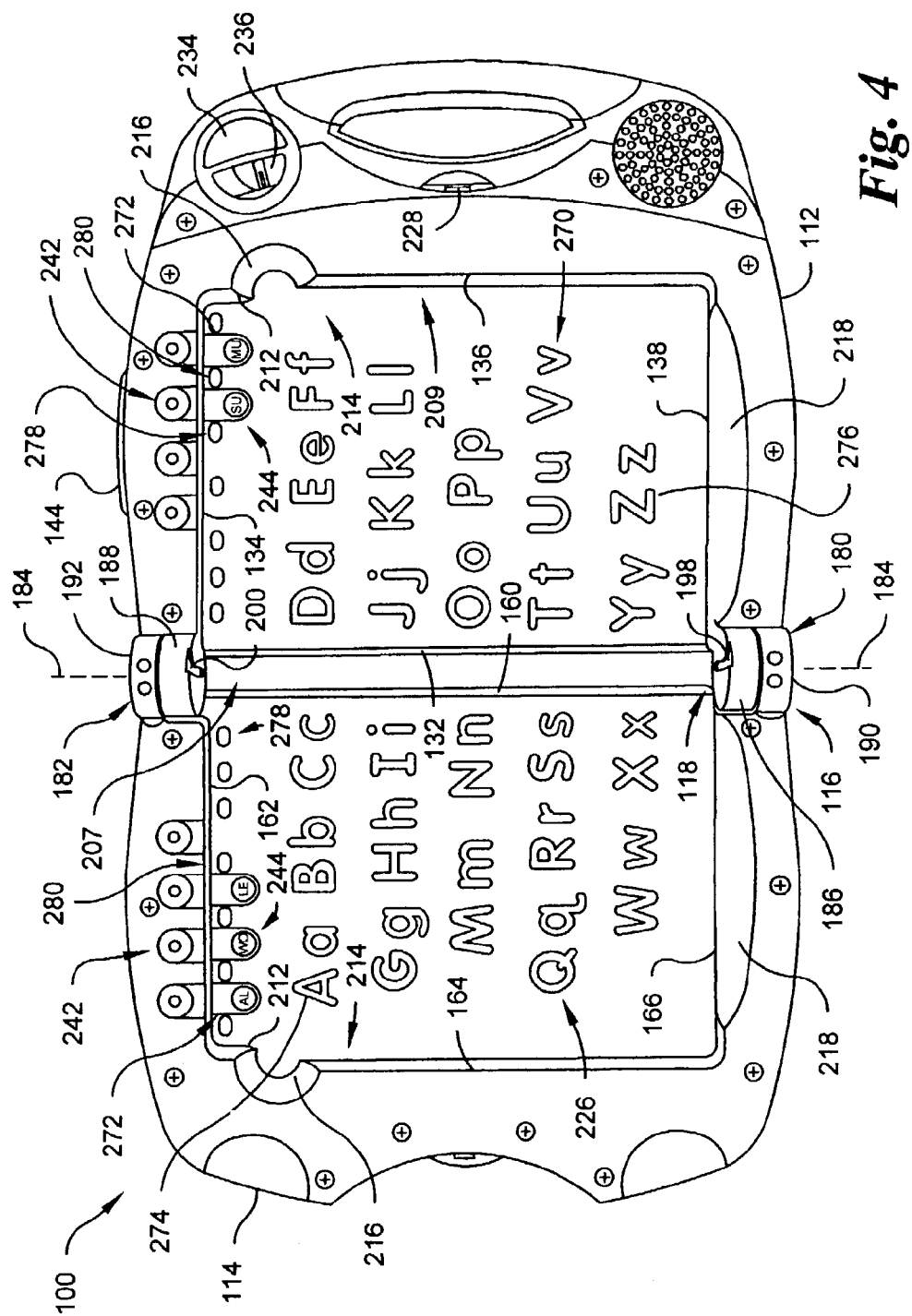
FIG. 4 is a top plan view of the electronic learning device of FIG. 1 in the open position.
Figure 5:
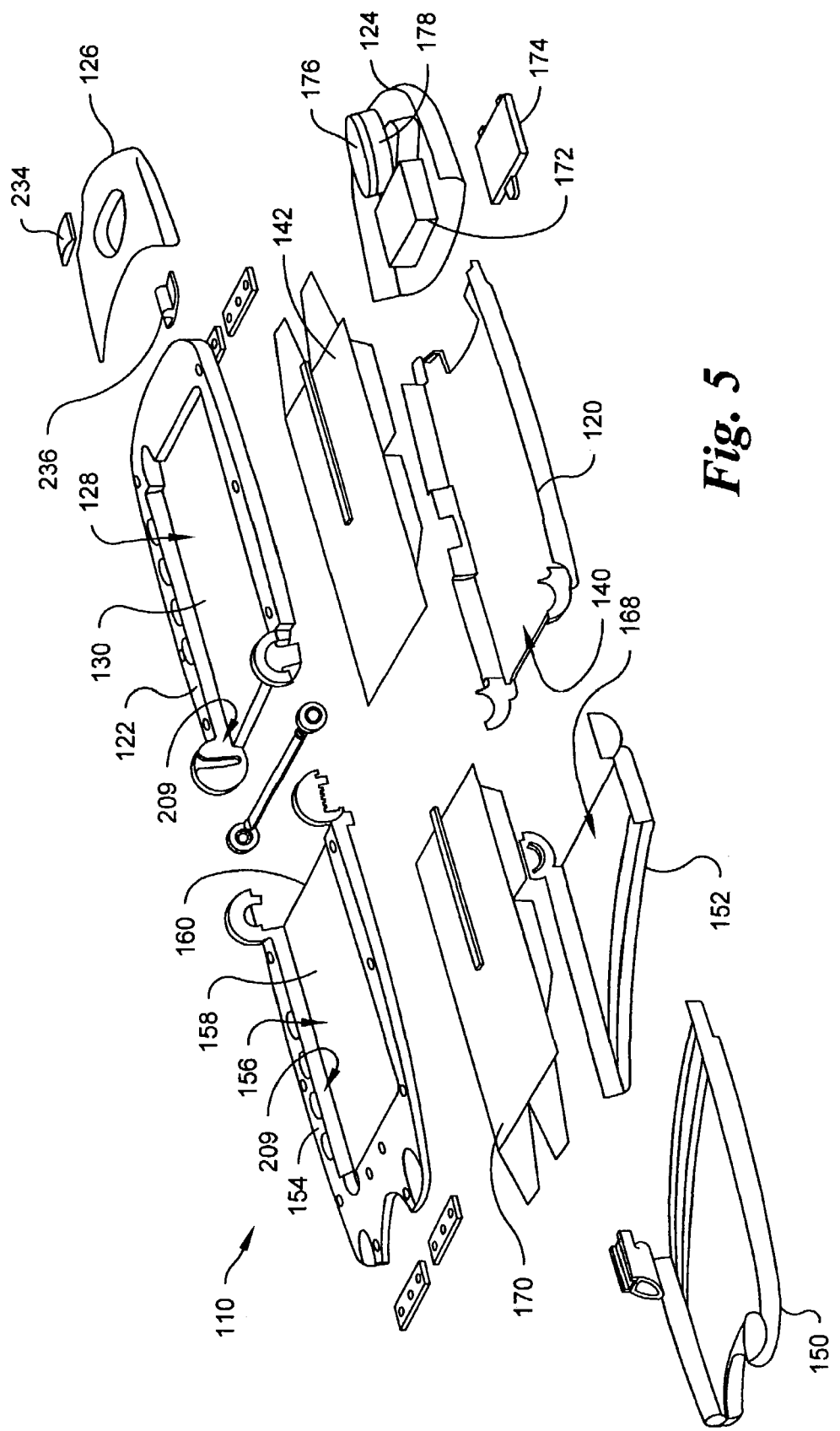
FIG. 5 is an exploded top perspective view of the electronic learning device of FIG. 1.

Referring to FIG. 5, the base 112 preferably is a four-piece construction comprising a base outer 120, a base inner 122, a handle outer 124 and a handle inner 126. The base 112 has a base recess 126 with a base-recess surface 130 in the base inner 122. The base recess 128 is bounded by a base-recess edge 132 and first, second and third base-recess sidewalls 134, 136, 138. The base outer 120 and the base inner 122 are joined and support in a base space 140 therebetween a base grid 142 discussed below. A cartridge slot 144 shown in FIG. 4 for receiving a removable ROM cartridge 146 shown in FIG. 3 and discussed below is formed in the base outer 120. The handle outer 124 and the handle inner 126 are joined to each other and respectively joined to the base outer 120 and base inner 122 to form a hand grip 148 for carrying the electronic learning device 100.

The cover 114 preferably is a three-piece construction comprising a cover top 150, a cover outer 152 and a cover inner 154. The cover 114 has a cover recess 156 with a cover-recess surface 158 in the cover inner 154. The cover recess 156 is bounded by a cover-recess edge 160 and first, second and third cover-recess sidewalls 162, 164, 166. The cover top 150 and the cover outer 152 are joined with the cover inner 154 and support in a cover space 168 therebetween a cover grid 170 discussed below. When the housing assembly 110 is in the closed position (FIG. 2), the cover inner 154 and the base inner 122 oppose each other, and the cover top 150, cover outer 152, handle outer 124, base outer 120, and a portion of the handle inner 126 form the outwardly facing surfaces of the housing assembly 110. A battery compartment 172 having a removable battery cover 174 and a speaker retainer 176 supporting a speaker 178 are provided in the handle outer 124. The base 112 and cover 114 may have a construction comprising a number of pieces different the aforementioned numbers without departing from the spirit and scope of the invention.

Referring to FIGS. 4, and 6-8, the hinge assembly 116 connects the base 112 to the cover 114. The hinge assembly 116 comprises a first hinge 180 and a second hinge 182 spaced from the first hinge 180. The first and second hinges 180, 182 have an axis of rotation 184 spaced from the base-recess edge 132 and the cover-recess edge 160. The first and second hinges 180, 182 have first and second inner hinge elements 186, 188 integral with the base 112 and first and second outer hinge elements 190, 192 integral with the cover. Both the inner and outer hinge elements 186, 188, 190, 192 are generally hollow cylinders. An annular ring 194 extending from the inwardly facing side of each outer hinge element 190, 192 is journaled in the adjacent outwardly facing side of each corresponding inner hinge element 186, 188. The hinge elements 186, 188, 190, 192 are configured to provide a passageway 196 through each hinge element 186, 188, 190, 192 and annular ring 194 for electrical conductors (not shown) connecting electronics in the base 112 to electronics in the cover 114. At least one of the first and second hinges 180, 182, and preferably both the first and second hinges 180, 182, have a detent (not shown) for releasable holding the housing assembly 110 in the open position. Further, the first and second hinges 180, 182 preferably are configured as friction hinges that oppose free rotation of the cover 114 relative to the base 112.

Figure 6:
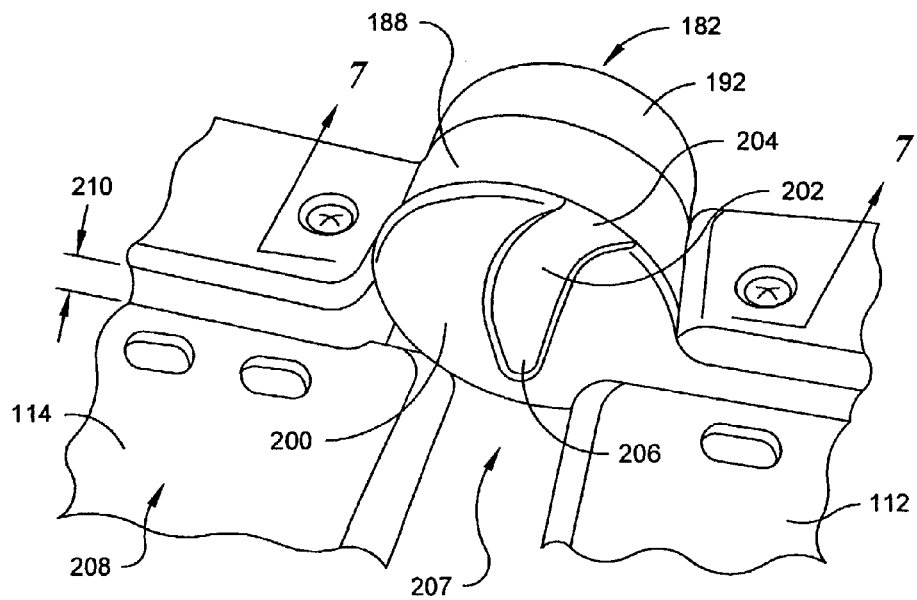
FIG. 6 is a top perspective view of a portion of the electronic learning device of FIG. 1 showing a hinge and a mounting element with a mounting slot.
Figure 7:
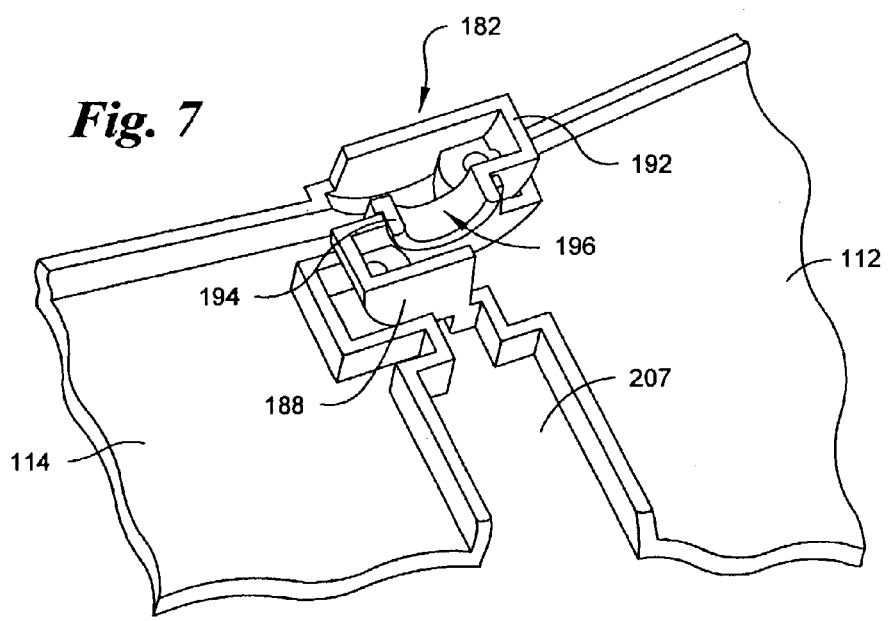
FIG. 7 is a top perspective view of a cross section of the portion of the electronic learning device of FIG. 6 taken along the line 7-7 of FIG. 6.
Figure 8:
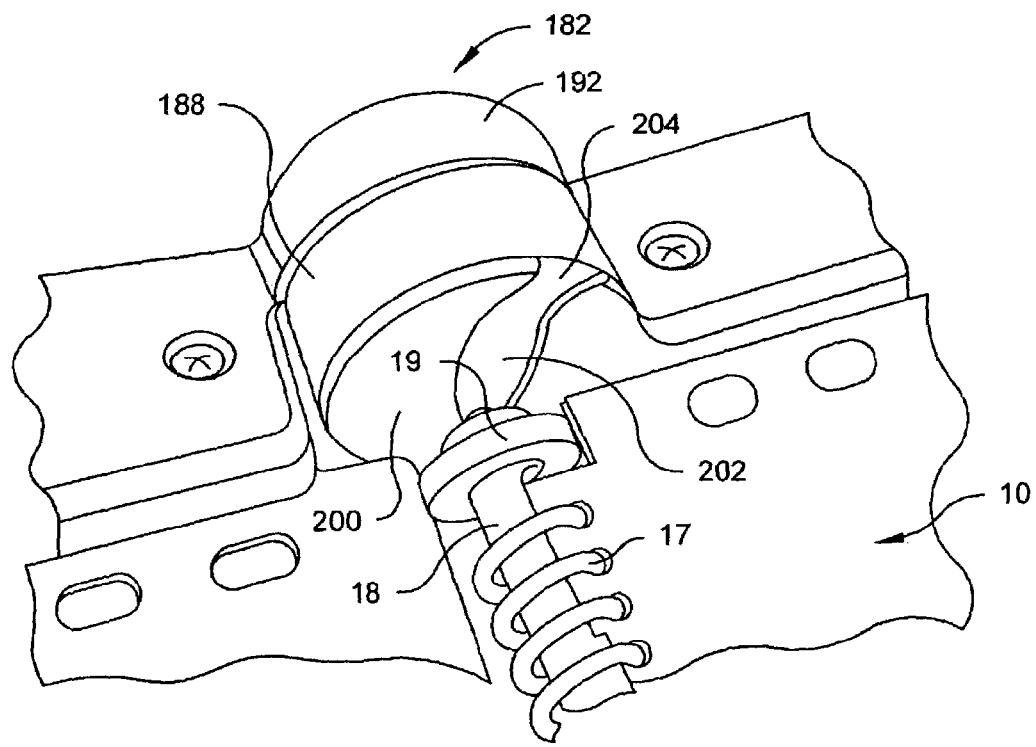
FIG. 8 is a top perspective view of a portion of the electronic learning device of FIG. 1 showing a portion of a book spine in a mounting slot.

Referring to FIGS. 5-6 and 8, the book mounting assembly 118 has a first mounting element 198 integral with the first hinge 180 and a second mounting element 200 integral with the second hinge 182. The first and second mounting elements 198, 200 are configured to releasably retain the book 10. Preferably, the first and second mounting elements 198, 200 have a mounting slot 202 with a mounting-slot opening 204 spaced from a mounting-slot rest 206 and offset laterally from the mounting-slot rest 206 toward the base recess 128. Although the mounting slot 202 may have a variety of shapes and orientations, the preferred shapes and orientations are those that prevent the book 10 from falling out of the electronic learning device 100 when the housing assembly 110 is in the closed position. More specifically, the mounting slot 202 is configured to guide the spine 18 of the book 10 to the mounting-slot rest 206 and releasably retain the spine 18 at least generally coincident with the axis of rotation 184 of the hinge assembly 116 in a book-spine receiving slot 207 formed by the first and second inner hinge elements 186, 188 and the base-recess and cover-recess edges 132, 160.

Although the preferred embodiments for the binding 17 and spine 18 disclosed for the book 10 are a spiral binding attached to a semi-cylindrical rod-shaped spine, the book mounting assembly 118 is not limited to the preferred embodiment for the binding 17 and the spine 18. Books having variously configured binding and spine combinations such as ring or loop bindings attached to elongated rectangular members may be received and retained by the book mounting assembly 118 of the present invention.

Referring to FIGS. 3-4, the housing assembly 110 has a book well 208 formed by the base recess 128 and the cover recess 156. The book well 208 is configured to receive the book 10 when the book 10 is in the predetermined orientation. The book well 208 has book well sidewalls 209 formed by the first, second and third base-recess sidewalls 134, 136, 138 and the first, second and third cover-recess sidewalls 162, 164, 166. The book well sidewalls 209 are configured to generally conform with the two-page spread 20. Accordingly, the book well 208 has a clearance fit with the book 10 and with the two-page spread 20 and in cooperation with the end caps 19 of the spine 18 restricts movement of the book 10 and the two-page spread 20 in the book well 208. The book well 208 has a book well depth 210 suggestedly at least as thick and preferably greater than the thickness of the book 10. One of the first, second and third base-recess sidewalls 134, 136, 138 and a corresponding one of the first, second and third cover-recess sidewalls 162, 164, 166 preferably has a sidewall offset 212 configured to allow insertion of the book 10 in the book well 208 only when the at least one setback 14 of the book 10 is in registry with the sidewall offset 212.

The second base-recess sidewall 136 is spaced from and parallel to the base-recess edge 132. The second cover-recess sidewall 164 is spaced from and parallel to the cover-recess edge 160. The second base-recess sidewall 136 and the second cover-recess sidewall 164 preferably have a sidewall upper portion 214 having both the sidewall offset 212 and a sidewall setback 216 therein. The sidewall upper portion 214 of the second base-recess sidewall 136 and the second cover-recess sidewalls 164 correspond to the setback upper portions 36 of the opposed sides 30a, 30b of the two-page spread 20. The sidewall offsets 212 are configured to allow the two-page spread 20 to be fully open in the book well 208 only when the setback upper portions 36 of the opposed sides 30a, 30b of the two-page spread 20 are in registry with the sidewall offsets 212 of the second base-recess sidewall 136 and the second cover-recess sidewall 164. The third base-recess sidewall 138 and third cover-recess sidewall 166 have a bevel 218 configured to provide unobstructed tactual and visual access to the bottom portion of the base-recess and cover-recess surfaces 130, 158 and to the page-spread bottom portion 32 when a book 10 is in the book well 208 with the page-spread bottom edge 34 adjacent the third base-recess and cover-recess sidewalls 138, 166.

Figure 2:
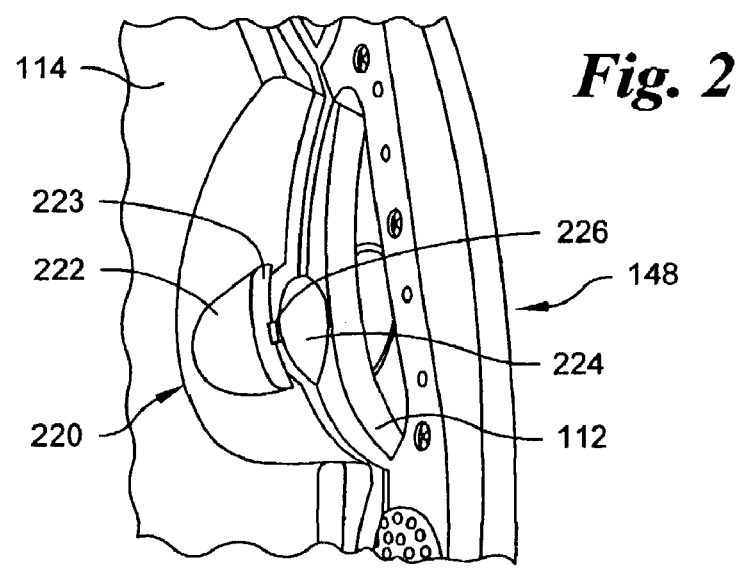
FIG. 2 is a top perspective view of a portion of the electronic learning device in FIG. 1 showing the latch assembly.

Referring to FIGS. 1-2 and 4, the housing assembly 110 has a latch assembly 220 that releasably secures the housing assembly 110 in the closed position. The latch assembly 220 comprises a latch 222 slidably mounted in the cover top 150 and a generally crescent-shaped catch 224 extending outwardly from the handle inner 126. The latch 222 is spring biased in an extended position. A latch tongue 226 projecting from the end of the latch 222 extends into a corresponding catch slot 228 in the crescent-shaped catch 224 when the housing assembly 110 is in the closed position. Depression of the latch 222 retracts the latch tongue 226 from the catch slot 228 allowing the housing assembly 110 to be pivoted to a fully open, two-page spread position. The latch 222 is relatively large and has a beveled under surface 223 that enables the cover 114 to be more easily lifted from the base 112 by a small child.

Referring to FIGS. 1, 3-4, 10-11 and 16, an electronic user interface 230 is in the housing assembly 110. The electronic user interface 230 comprises a position sensor 232, a power On/Off switch 234, the speaker 178, a speaker volume control 236, and a visible signal generator assembly 238 in electrical communication with base-unit control electronics 240 also in the housing assembly 110 and described below.

The visible signal generator 238 comprises an arrangement of light sources 242. Preferably, the light sources 242 are light emitting diodes (LEDs). In one embodiment of the housing assembly 110, eight LEDs are provided and are in registry with selectable mode icons 244 disclosed below. Four of the eight LEDs are mounted in the base 112 above the base recess 128 proximal to the first base-recess sidewall 134. The remaining four LEDs are mounted in the cover 114 above the cover recess 156 proximal to the first cover-recess sidewall 162. The LEDs mounted in the base 112 and the cover 114 are preferably uniformly spaced but also may be non-uniformly spaced. The LEDs are individually controlled by the base-unit control electronics 240 and are illuminated under varying circumstances such as when the electronic learning device 100 is powered "On" or times out, during audio instructions or prompts, when a mode is entered and exited, and when music is played. Other rules that are script based may also control the illumination of the LEDs such as the illumination of various sequences of LEDs in response to correct or incorrect responses to prompts.

Although the preferred embodiment for visible signal generator 238 is an arrangement of eight LEDs in registry with eight corresponding selectable mode icons 244, the visible signal generator 238 is not limited to the preferred embodiment. For example, the visible signal generator 238 may have more or less light sources 242 than the number of selectable mode icons 244 and may be arranged in alternate configurations. Further, visible signal generator 238 may have other light sources such as strobe lights, neon lights and the like. Still further the visible signal generator may be one or more liquid crystal displays (LCDs) capable of presenting graphic animations and other visual images without departing from the scope and spirit of the invention.

The position sensor 232 and its operation are the subject of U.S. Provisional Application No. 60/385,159 filed May 30, 2002 and entitled "Interactive Book-Reading Device with Intelligent Finger-Touch Sensor", and U.S. Provisional Patent Application No. 60/290,444 filed May 11, 2001 and entitled "Interactive Reading System with a Non-Contact Finger Sensor", both incorporated herein by reference. The position sensor 232 also is the subject of co-pending international patent application PCT/US502/14745 entitled "Interactive Book Reading System Using RF Scanning Circuit" and filed May 10, 2002 by the assignee of the present application. International patent application PCT/US502/14745 is incorporated herein by reference. Another co-pending U.S. Non-Provisional Application entitled "Interactive Multi-Sensory Reading System Electronic Teaching/Learning Device", Ser. No. 10/448,562 filed May 30, 2003 and directed to the position sensor 232 is also incorporated herein by reference. Accordingly, only the features of the position sensor 232 pertinent to an understanding of the electronic learning device 100 are briefly summarized here.

Figure 10:
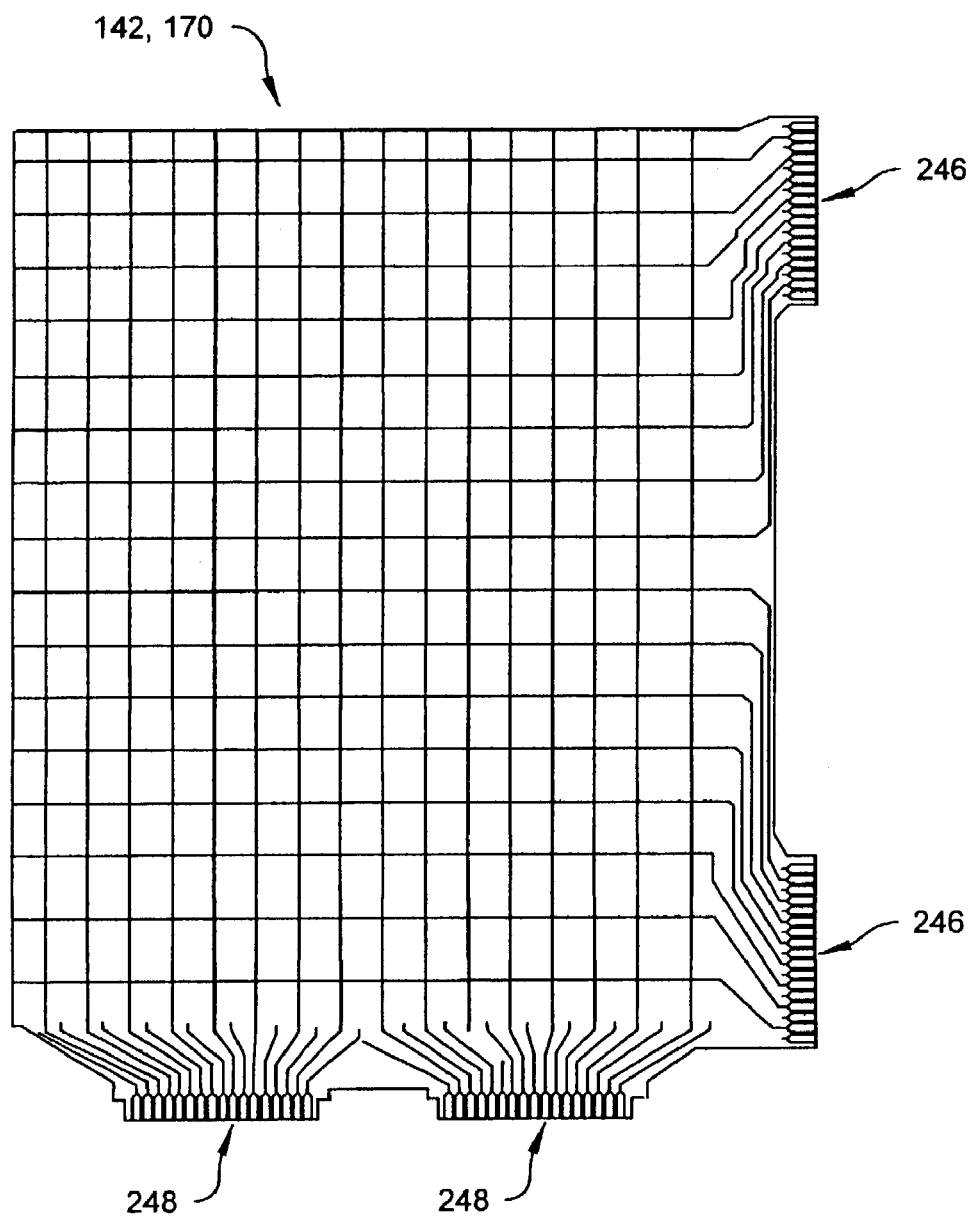
FIG. 10 is a top plan view of a schematic of the cross-point array (or grid) for the position sensor of the electronic learning device in FIG. 1.
Figure 11:
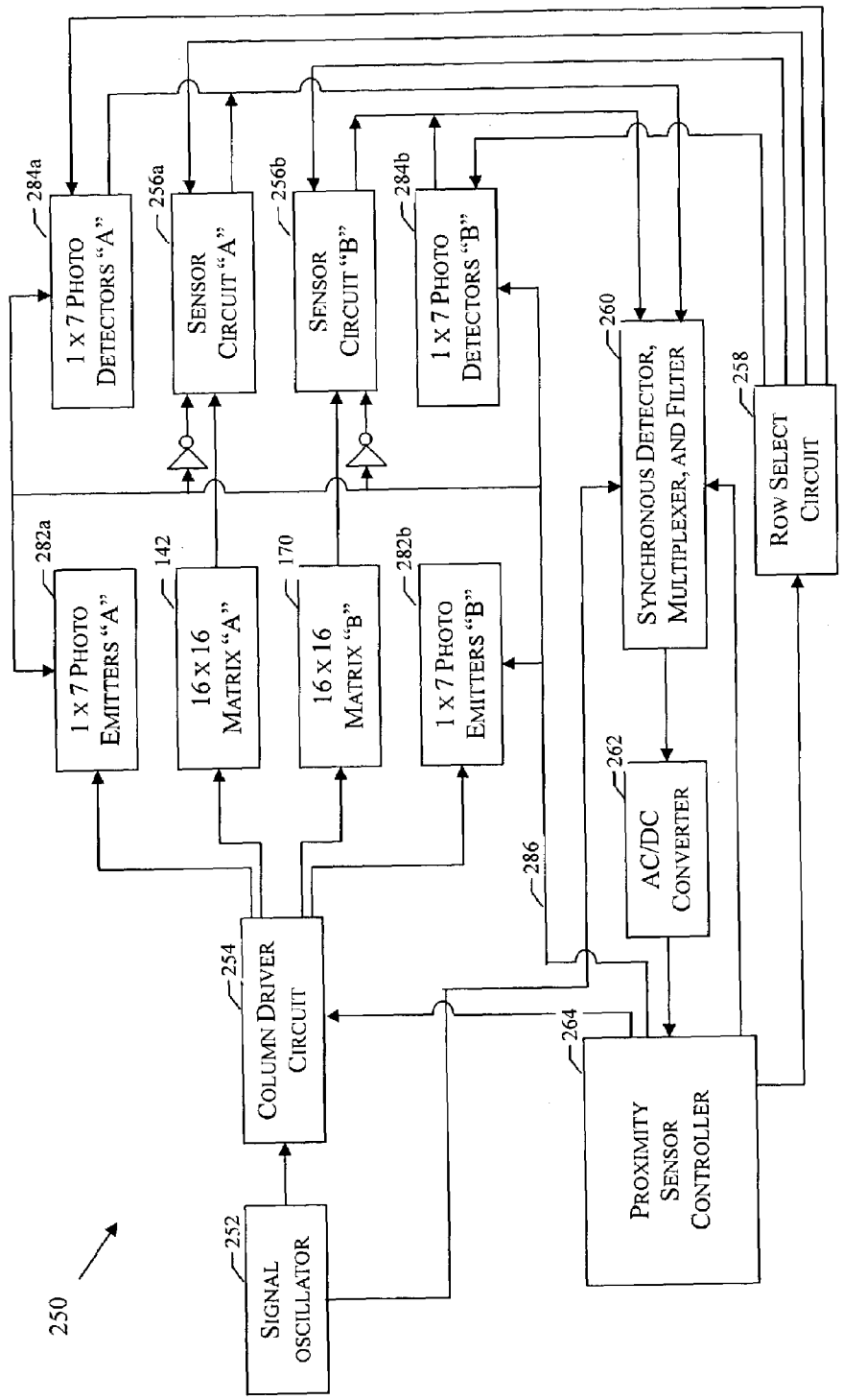
FIG. 11 is a schematic of the position sensor electronics of the electronic learning device in FIG. 1.

Referring to FIGS. 5 and 10-11, the position sensor 232 comprises two cross-point arrays and the associated position-sensor electronics 250. One of the cross-point arrays is positioned in the base space 140 below the base recess 128 and has been referred to above as the base grid 142. The other cross-point array is positioned in the cover space 168 below the cover recess 156 and has been referred to above as the cover grid 170. The position sensor 232 senses the presence of a user's finger (not shown) proximal to the book well 208 and determines in an x-y plane, corresponding to the plane of the base and cover grids 142, 170, the point above which the finger is positioned.

Each cross-point array 142, 170 preferably is a sixteen row by sixteen column rectilinear grid formed by sixteen parallel electrical conductors (or row conductive lines) 246 defining the rows separated by a Mylar sheet (not shown) from sixteen parallel conductors (or column conductive lines) 248 orthogonal to the row conductive lines 246 and defining the columns, as shown in FIG. 10. The row conductive lines 246 and the column conductive lines 248 may be widened around and between each cross-point of the grid. The number of rows and columns of conductive lines may be more than sixteen or less than sixteen depending on the desired special resolution of the position sensor 232.

One preferred embodiment of the position-sensor electronics 250 comprises a radio frequency (RF) signal oscillator 252, a column driver circuit 254, the two sixteen-by-sixteen base and cover grids 142, 170, two sensor circuits 256a, 256b, a row select circuit 258, a synchronous detector, multiplexer and filter 260, an analog to digital converter 262, and a position-sensor controller 264. The signal oscillator circuit 252 generates a square wave signal having a frequency of approximately 250 kHz at 3.3V to the column driver circuit 254. Corresponding pairs of the column conductive lines 248 of the base and cover grids 142, 170 are excited sequentially from one through sixteen with, for example, the square wave generated by the signal oscillator 252. The row conductive lines 246 of each of the base and cover grids 142, 170 are scanned sequentially from one through sixteen during each excitation of each of the column conductive lines 248. In this manner, each cross-point of the base and cover grids 122, 170 is measured individually. The row select circuit 258 directs the sequential sensing of the sensor circuits 256a, 256b under the control of the position-sensor controller 264. The sensor circuits 256a, 256b detect signals on the row conductive lines 246 of the base and cover grids 142, 170 and forward the detected signals to the synchronous detector, multiplexer and filter 260. Thereafter, the detected signals are converted to digital signals by the AC/DC converter 262 and forwarded to the position-sensor controller 264 for analysis.

The measured values of each cross-point are stored in volatile random access memory ("RAM") associated with the position-sensor controller 264. When a finger or hand is present over the base and cover grids 142, 170, the value of signals received by the sensor circuits 256a, 256b is reduced at the location of the finger or hand over individual cross-points. By comparing successive full scans of the base and cover grids 142, 170 for the presence of a finger, the precise location of the finger is determined.

Although the RF based position sensor 232 disclosed above is the preferred sensor for inclusion in the electronic learning device 100, alternative sensors for detecting selection of the selectable content 36 or first arrangement of selectable mode icons 40 of the book 10 or the selectable indicia 270 or the second arrangement of selectable mode icons 272 of the book well 208 may be included in the electronic user interface 230 without departing from the scope and spirit of the invention. For example, the base and cover grids 142 and 170 could be replaced by an array of pressure sensitive switches or a stylus based selector system such as the "Surface Position Location System and Method" disclosed in U.S. Pat. No. 5,877,458 (Flowers) or the "Electrographic Position Location Method and Apparatus" disclosed in pending international application PCT/US01/10394 (Flowers), both incorporated herein by reference.

Overlaying the electronic user interface 230 is a physical user interface 230' comprising a book-well layout 266 with or without the page-spread layout 22, depending on whether the book 10 is or is not in the book well 208. As discussed below, software mapping active areas of the book-well layout 266 or the page-spread layout 22 to the underlying cross-points of the base and cover grids 142, 170 in registry with the active areas communicates to a base-unit microcontroller 288 the selection of an active area when the user's finger is on or proximal to the active area.

Referring to FIG. 4, the book-well layout 266 comprises an arrangement of selectable indicia 270 and a second arrangement 272 of selectable mode icons 244. The arrangement of selectable indicia 270 appears on the cover-recess surface 158 and the base-recess surface 130. The arrangement of selectable indicia 270 preferably comprises letters of the alphabet. The letters are arranged alphabetically as ordered pairs comprising the upper and lower case representation of each letter, such as a first ordered pair "Aa" 274 representing the letter "A" on the cover-recess surface 158 and a last ordered pair "Zz" 276 representing the letter "Z" on the base-recess surface 130. The boundary defining the representations in each pair is inscribed in the cover-recess and base-recess surfaces 158, 130. Placing a finger on or in the proximity of any of the letters selects the letter. The arrangement of selectable indicia 270 may be graphic representations of numbers, other symbols and/or objects without departing from the scope and spirit of the invention.

The second arrangement 272 of selectable mode icons 244 appears on the cover-recess surface 158 and base-recess surfaces 130. Preferably, three selectable mode icons corresponding to reading modes such as an alphabet mode, a words mode, and a letters (or spelling) mode are provided above the arrangement of ordered pairs of letters appearing on the cover-recess surface 158 and two selectable mode icons corresponding to activity modes such as a surprise (or game) mode and a music mode are provided above the arrangement of ordered pairs of letters appearing on the base-recess surface 130. Placing a finger on or in the proximity of any of the aforementioned mode icon 244 selects the corresponding mode of operation for the Electronic learning device 100. The preferred reading and activity modes are discussed below.

Referring to FIG. 13 the page-spread layout 22 comprises selectable content 36 and a first arrangement 38 of the selectable mode icons 40 thereon. The selectable content 36 may include graphics, words or individual letters. The first arrangement 38 of the selectable mode icons 40 appears in the upper margin 42 of the page-spread layout 22.

The first (or left) page 44 and second (or right) page 46 of the page-spread layout 22 are representative of the selectable content 36 and selectable mode icons 40 appearing on pages such as the first and second pages 16*a*, 16*b* of the book 10. Preferably, the left page 44 of the page-spread layout 22 has four selectable mode icons corresponding to reading modes such as a story mode, a words mode, a phonics (or sounds) mode and a spelling (or letter) mode icons and the right page 46 of the page-spread layout 22 has four selectable mode icons corresponding to activity modes such as a find mode, a surprise (or game) mode, a count mode, and a music mode. It will be appreciated that fewer or more mode icons and/or mode icons corresponding to different functions from those listed can be provided in different arrangements. Placing a finger on or in the proximity of any of the aforementioned mode icons 40 selects the corresponding mode.

A page identification sensor 278 is in the housing assembly 110. The page identification sensor 278 is the subject of U.S. Provisional Patent Application No. 60/443,967 filed Jan. 31, 2003 and entitled "Optical Page Identification System" and is incorporated herein by reference. Accordingly, only the features of the page identification sensor 278 pertinent to an understanding of the electronic learning device 100 are briefly summarized here.

Figure 9:
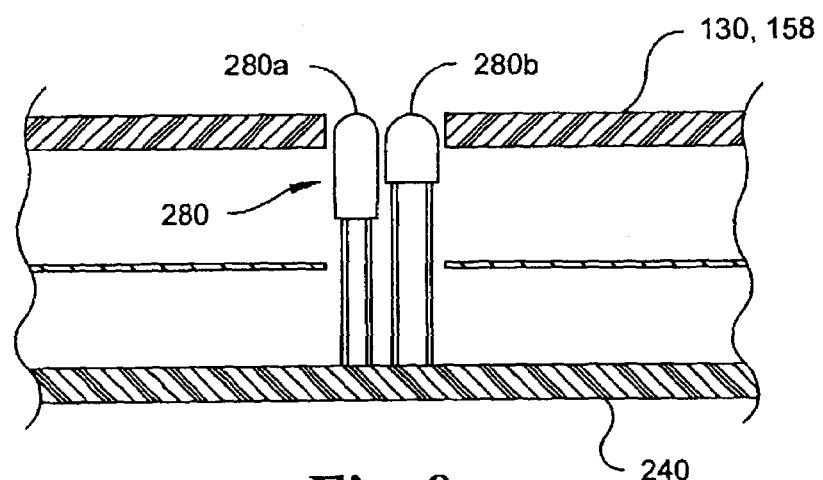
FIG. 9 is a schematic of a cross sectional view of one of the emitter-detector pairs of the electronic learning device of FIG. 4.

Referring to FIGS. 4 and 8-9, the page identification sensor 278 comprises a plurality of optical emitter and detector pairs 280 and the associated page-identification sensor electronics. The optical emitter and detector pairs 280 are mounted upwardly facing at locations in the base-recess surface 130 and the cover-recess surface 158 in registry with the location of the page identifier 32 appearing on the pages 16*a*, 16*b* of the book 10. The spacing between emitter-detector pairs 280 may be uniform or non-uniform provided there is positional correspondence with the page identifier 32. Preferably, the emitter-detector pairs 280 are positioned proximal to the first base-recess sidewall 134 and the first cover-recess sidewall 162 at locations that reduce the likelihood that a finger selecting an active area or mode icon 40, 244 of the book-well layout 266 or a page-spread layout 22 will interfere with the proper functioning of the page identification system 278.

Preferably, but not necessarily, the optical emitter-detector pairs 280 are infra-red (IR) emitters 280*a* and detectors 280*b*. However, the emitter-detector pairs 280 could operate at other optical wavelengths without departing from the scope of the invention. The emitter-detector pairs 280 are positioned to irradiate and detect the page identifier 32 of the two-page spread 20. Preferably, but not necessarily, there are seven emitter-detector pairs 280 mounted in each of the base and cover recess surfaces 130, 158. The number of emitter-detector pairs 280 may be more or less than fourteen and is determined by the number of book pages to be uniquely identified.

Referring to FIGS. 14 and 15, the preferred coding scheme for the page identifiers 32 is based on the presence of unique hole patterns in the plurality of two-page spreads 20 comprising the book 10. The hole patterns correspond to the die strike codes 50 shown in FIG. 14. A book assembled from two-page spreads 20 having hole patterns produced in accordance with the die strike codes 50 would present to the page-identification sensor 278 the spread codes 52 shown in FIG. 15. For example, for a book having a front cover and a back cover with eight two-page spreads therebetween, in the preferred coding scheme, the page identifiers 32 in sequence for the first to the eighth two-page spread have hole patterns corresponding to die strike codes 52 numbered 04 to 11, respectively. When such a book is in the book well 208 of the electronic learning device 100, the page identifiers 32 for the eight two-page spreads appear to the page identification sensor 278 as the spread codes 52 numbered 04 to 11, respectively. When the book is closed and the front cover is viewable, the spread code appears to the page identification sensor 278 as the spread code 32 numbered 00. The spread code 32 corresponding to the back cover of the book is the spread code 32 numbered 14. When no book is present, the page identification sensor 278 will sense the spread code 32 numbered 15. Preferably, but not necessarily, a foil pad 54 is positioned on each page in accordance with the scheme shown in FIG. 14 to increase the intensity of the reflectance when the closed-hole positions are irradiated by the emitters 280*a*.

Referring to FIG. 11, the page-identification sensor electronics are integrated with the position-sensor electronics 250. The page-identification sensor electronics comprise optical emitter and detector circuits 282*a*, 282*b*; 284*a*, 284*b*, corresponding to the emitter-detector pairs 280, and an optical enable line 286. Control and synchronization of the optical emitter and detector circuits 282*a*, 282*b*; 284*a*, 284*b* with the column driver circuit 254 and the sensor circuits 256*a*, 256*b* is accomplished by the optical enable line 286 under the control of the position-sensor controller 264.

The artisan will understand from the above disclosure of the preferred embodiment of the page identification sensor 278 and page identifier scheme that alternative methods for identifying pages may be used with the electronic learning device 100 without departing from the spirit and scope of the invention. For example, to identify a currently viewable page, the user may be instructed to touch a page identification icon uniquely positioned on the page and in registry with a pressure sensitive switch or other detector to indicate to a controller the page being viewed. Still further, a page turn may be detected by a finger well based optical system having a light beam that is obstructed by a finger turning a page, such as the optical system disclosed in U.S. Patent Application Publication No. US 2001/0051329 A1 (Lynch et al.) entitled "Print Media Receiving Unit Including Platform And Print Media" and incorporated herein by reference.

Figure 16:
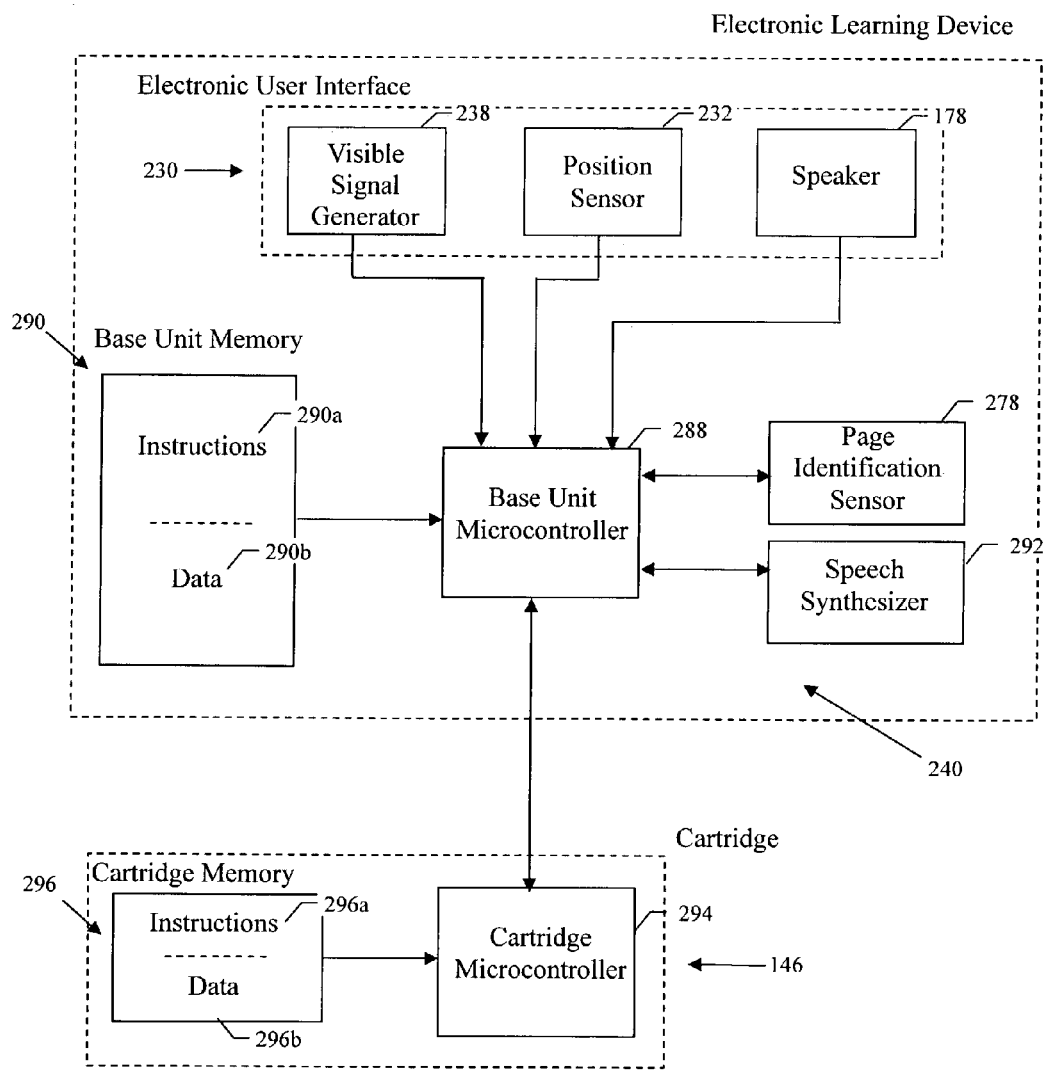
FIG. 16 is a schematic of the electronics for the electronic learning device of FIG. 1.
Figure 17:
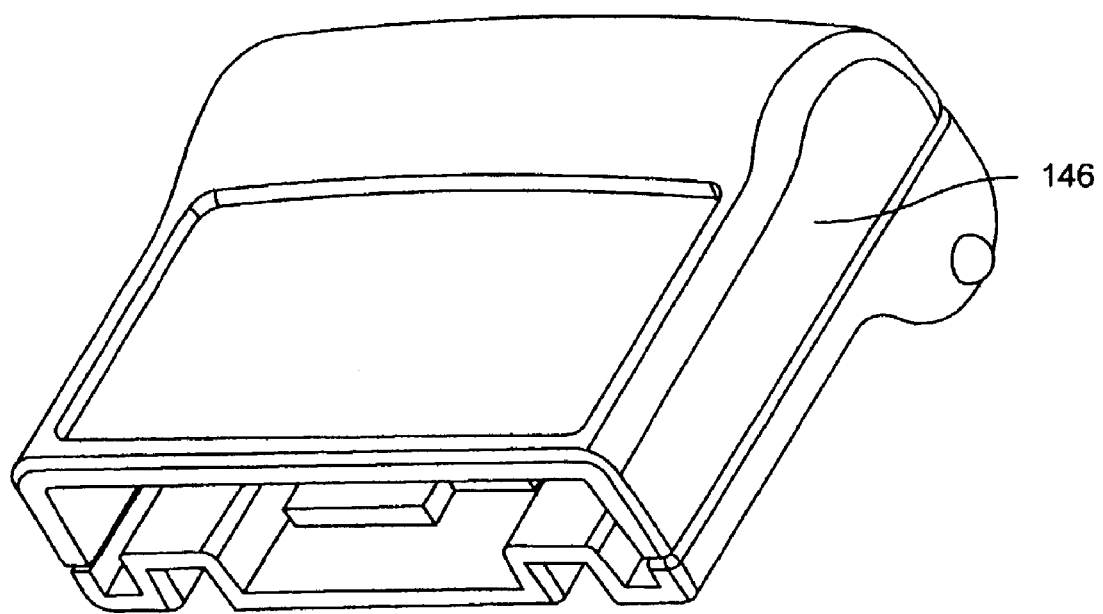
FIG. 17 is a top perspective view of the cartridge for use with the electronic learning device of FIG. 1.

Referring to FIG. 16, control electronics 240 for the electronic learning device 100 are housed in the housing assembly 110. The control electronics 240 comprise a base-unit microcontroller 288 in electrical communication the electronic user interface 230, the page identification sensor 278, base-unit non-volatile memory 290 and a speech synthesizer 292. The base-unit microcontroller 228 is configured to perform at least the following functions: (a) to operate in accordance with the instructions associated with each mode icon; (b) to determine a position of the selector when the selector is within the active range of the position sensor, (c) to recognize the page identifier, and a selection by the selector of one of the selectable mode icons, the selectable indicia or the selectable content; and (d) to send to the user interface a signal associated with the selection, as further discussed below.

The base-unit memory 290 stores base-unit content comprising embedded base-unit software including, but not limited to, preprogrammed instructions for controlling the electronic user interface 230, the page identification sensor 278, and a speech synthesizer 292. The base-unit content also preferably includes preprogrammed instructions (or scripts)

and associated data for base game-play and for at least one book, such as the book 10. The housing assembly 110 and the base-unit control electronics 240 are configured to interface with the removable cartridge 146 comprising a cartridge microcontroller 294 and cartridge memory 296 comprising preprogrammed instructions 296a and data 296b associated with additional books configured similar to the configuration of the book 10. The base-unit microcontroller 288 may or may not transfer control of the base-unit functionality to the cartridge microprocessor 294 depending on the nature of the preprogrammed instructions stored therein. Alternatively, control might be shared between the base-unit microcontroller 288 and the cartridge microcontroller 294 or be held by a single controller performing all control functions.

Once the electronic learning device 100 is turned "On", all functionality, except volume control and a reset switch (not shown), is controlled by the interaction of the user's finger with the position sensor 232. The mode icons 244 on the book-well layout 266 and the mode icons 40 on a page-spread layout 22 have x-y coordinates that are stored in base-unit memory 290. Similarly, individual indicia or letters of the arrangement of selectable indicia 270 appearing in the book-well layout 266, and the selectable content 36 appearing in the page-spread layout 22 of the book 10 have x-y coordinates that are stored in base-unit memory 290. The x-y coordinates of the mode icons 40, 244 and the selectable content 36 correspond to the x-y coordinates of the cross points of the base grid 142 and cover grid 170 with which they are in registry.

Other system functions controlled by the embedded base-unit software include system start-up and shut-down, integration of the cartridge microcontroller 294 with the base-unit microcontroller 288, and management of the visual signal generator 238 and the speaker 178. Software for the start-up and shut-down function provides for sound effects and a welcome dialogue upon turning the power switch "On", followed by an instruction dialogue such as "let's play", "put a book in the base-unit", or "let's listen to the alphabet". The base-unit control electronics 240 will time out if no response is provided for a predetermined period of time. ROM cartridge integration software provides for the electronic learning device 100 to automatically reset and initiate a cartridge specific welcome dialogue if the cartridge 146 is inserted in the base-unit cartridge slot 144 when the electronic learning device 100 is already "On". Visual signal generator management software comprises rule-based instructions controlling lighting of the LEDs under varying circumstances such as when the unit is powered "On" and times out, during audio instructions and wait time, when a mode is entered and exited, and while music is being played. The software also permits script-based control of the Visual signal generator 238.

The method of teaching linguistics using a device such as the electronic learning device 100 of the present invention is the subject of U.S. Provisional Application No. 60/385,024 filed May 31, 2002 and is also the subject of a co-pending U.S. Non-Provisional Application entitled "Method of Teaching Linguistics", Ser. No. 10/448,581 filed May 30, 2003 also incorporated herein by reference. Accordingly, only the features of the control electronics and the base-unit content pertinent to an understanding of the operation of the electronic learning device 100 are briefly summarized here.

Base-unit content associated with the selectable content 36 of the book 10, such as words, graphics and letters, is script and mode dependent. The base-unit content comprises dialogue and sound effects organized in a database. For example, referring to the page-spread layout 22 in FIG. 13, if the script calls for an activity in a question and answer format, the database has a Question Template, such as "Touch the cookies that are shaped like a <shape>", where <shape> is selected from a Shape List including "triangle", "circle", and "square" in the database. The x-y coordinates of the possible correct responses for the selected shape are stored in a Correct List in the database, the selection of any member of which causes the execution of a Correct Template, such as "<affirmative acknowledgement>. That's a <correct shape>", where <affirmative acknowledgement> is selected form an Affirmative Acknowledgement List including "Good job", "That's right", and "Got it". The x-y coordinates for possible incorrect responses are stored in an Incorrect List in the database, the selection of any member of which causes the execution of an Incorrect Template, such as "<negative acknowledgement>. That's a <incorrect shape>", where <negative acknowledgement> is selected from a Negative Acknowledgement List including "Oops", "Try again", and "Whoa", and <incorrect shape> is the name of the shape incorrectly selected and is stored in an Incorrect Shape List associated with the question asked. Sound effects stored in a Sound Effects List may be included with any of the templates.

The base-unit content preferably is organized into eight different modes: four reading modes and four activity modes. The four reading modes are story mode, words mode, spelling (or letters) mode and phonics (or sounds) mode. The four activity modes may be find mode, surprise (or game) mode, count mode and music mode. Placing a finger on or proximal to one of the reading or activity mode icons 40, 244 places the base-unit microcontroller 288 in the selected mode and activates predetermined script templates that are stored in memory (either as base-unit content or ROM-cartridge content) and associated with the selected mode.

When the base-unit microcontroller 288 is in the story mode, the alphabet letters on the book-well layout 266 or the story text on the page-spread layouts 22 are read to the user. When the base-unit microcontroller 288 is in the words mode, any word that is selected thereafter are read aloud. Further, in word mode, for any graphic that is selected, the Electronic learning device 100 outputs the corresponding dialogue from the associated script and also outputs any scripted sound effect. When the base-unit microcontroller 288 is in the spelling (or letters) mode, any word subsequently selected is spelled, letter-by-letter. When the base-unit microcontroller 288 is in the phonics (or sounds) mode, sounds corresponding to the phonemic elements of discontinuous speech associated with the letters of any subsequently selected words are output according to the template, <word> <separate phonemic elements> <word>.

When the base-unit microcontroller 288 is in the find mode, the user's visual discrimination skills are enhanced by being asked to find and/or touch various words and objects in the selectable content 36 of the page-spread layout 22 or one of the indicia of the arrangement of selectable indicia 270 in response to a prompt. Surprise mode is like a wild card. When the base-unit microcontroller 288 is in the surprise mode, the user participates in an activity that may not fit into any of the other modes. Some examples of activities that are provided in the surprise mode include: rhyming, matching, patterning, and jokes or riddles. The surprise mode also includes any activity that involves compound selections such as the following scripted interaction: "Find something big. (child touches a big triangle 48a) . . . Great! That triangle is big. Now, touch a small triangle (referring to the small triangle 48b)." See FIG. 13. When the base-unit microcontroller 288 is in the count mode, the user is asked to find a certain number of objects in the page-spread layout 22. For example the user may be asked, "Find five triangles". Each new triangle pointed to in this game "sounds off" with its number. Order is unimportant. Objects that have already been counted may elicit "You've already counted me, can you find another triangle?" Until all objects have been counted, other forms of acknowledging that an object has been previously counted also may be output without departing from the scope and spirit of the invention. When the base-unit microcontroller 288 is in the music mode, the user is prompted to select an object to hear a song and may also be prompted to select a sequence of objects to make a song.

The artisan will understand from the present disclosure that the eight modes and corresponding mode icons described above for the page-spread layout 22 are representative and not limiting. The Electronic learning device 100 and the book 10 used therein could have more than eight modes and icons or less than eight modes and icons without departing from the spirit and scope of the invention. The modes could be any of a wide variety of interactions well known in the art of electronic interactive educational aides. Still further, the artisan will understand that the modes of operation discussed above for a two-page spread 22 also may apply to the arrangement of selectable indicia 270 appearing on the base-recess and cover-recess surfaces 130, 158 of the book well 208. Accordingly, the user may engage in play and educational activities when the book 10 is not in the book well 208.

Those skilled in the art will understand that changes could be made to the embodiments described above without departing from the broad inventive concept thereof. For example, It is understood, therefore, that this invention is not limited to the particular embodiments disclosed, but it is intended to cover modifications within the spirit and scope of the present invention as defined by the appended claims.

We claim:

1. An interactive electronic device for receiving a book associated with an interactive electronic learning system responsive to a selector, the book having selectable content, the device comprising:
    a housing assembly having a book well configured to receive the book;
    a physical user interface in the book well, the physical interface comprising an arrangement of selectable indicia;
    an electronic user interface in the housing assembly, the electronic user interface comprising a position sensor having an active range including the selectable content of the book when the book is in the book well and the selectable indicia of the book well;
    control electronics in the housing assembly, the control electronics comprising:
        non-volatile memory having therein instructions associated with the selectable content of the book and the selectable indicia of the book well; and
        a controller in electrical communication with the electronic user interface, the controller configured
            a) to operate in accordance with the instructions in the non-volatile memory,
            b) to determine a position of the selector when the selector is within the active range of the position sensor,
            c) to recognize a selection by the selector of the selectable content of the book or one of the selectable indicia of the book well, and
            d) to send to the electronic user interface a signal associated with the selection.

2. The interactive electronic device according to claim 1, wherein the non-volatile memory is expanded by a removable memory.

3. The interactive electronic device according to claim 1, wherein the selector is a stylus.

4. The interactive electronic device according to claim 1, wherein the arrangement of selectable indicia comprises language symbols.

5. The interactive electronic device according to claim 1, wherein the arrangement of selectable indicia comprises an arrangement of letters.

6. The interactive electronic device according to claim 5, wherein the arrangement of letters are arranged alphabetically.

7. The interactive electronic device according to claim 1, wherein the arrangement of selectable indicia comprises letter pairs, each pair comprising an upper case representation of a letter and a lower case representation of the letter.

8. The interactive electronic device according to claim 1, wherein the arrangement of selectable indicia comprises numbers.

9. The interactive electronic device according to claim 1, wherein the arrangement of selectable indicia comprises symbols associated with music.

10. The interactive electronic device according to claim 1, wherein the arrangement of selectable indicia comprises a plurality of mode icons, each representing a mode of operation of the control electronics and selection of one of the plurality of mode icons causes the control electronics to operate in the corresponding mode of operation.

11. The interactive electronic device according to claim 1, wherein the selectable content comprises a graphic.

12. The interactive electronic device according to claim 1, wherein the selectable content comprises a word.

13. The interactive electronic device according to claim 1, wherein the selectable content comprises a letter.

14. The interactive electronic device according to claim 1, wherein the selectable content comprises a plurality of mode icons, each representing a mode of operation of the control electronics and selection of one of the plurality of mode icons causes the control electronics to operate in the corresponding mode of operation.

15. The interactive electronic device according to claim 1, wherein the electronic user interface generates a user perceivable signal associated with the selection.

16. The interactive electronic device according to claim 1, wherein the control electronics is configured to operate in a reading mode.

17. The interactive electronic device according to claim 16, wherein the reading mode teaches a name of a letter in an alphabet.

18. The interactive electronic device according to claim 16, wherein the reading mode teaches a sound associated with a letter in an alphabet.

19. The interactive electronic device according to claim 16, wherein the reading mode teaches a sound associated with a letter in a letter sequence spoken in continuous speech.

20. The interactive electronic device according to claim 16, wherein the reading mode teaches an order of a sequence of letters in an alphabet.

21. The interactive electronic device according to claim 16, wherein the reading mode teaches spelling.

22. The interactive electronic device according to claim 16, wherein the reading mode teaches a pronunciation of a word.

23. The interactive electronic device according to claim 1, wherein the control electronics is configured to operate in an activity mode.

24. The interactive electronic device according to claim 23, wherein the activity mode teaches shapes.

25. The interactive electronic device according to claim 23, wherein the activity mode teaches visual discrimination skill.

26. The interactive electronic device according to claim 23, wherein the activity mode teaches at least one of rhyming, matching and patterning.

27. The interactive electronic device according to claim 23, wherein the activity mode requires compound selection.

28. The interactive electronic device according to claim 23, wherein the activity mode teaches counting.

29. The interactive electronic device according to claim 23, wherein the activity mode teaches a music skill.

30. The interactive electronic device according to claim 1, wherein the instructions correspond to a template.

31. The interactive electronic device according to claim 30, wherein the template provides a question regarding one of the plurality of indicia and provides a response based on the selection.

32. An interactive electronic device for receiving a book associated with an interactive electronic learning system responsive to a selector, the device comprising:
- a housing assembly having a book well configured to receive the book;
- a physical user interface in the book well, the physical user interface comprising an arrangement of selectable mode icons;
- an electronic user interface in the housing assembly, the electronic user interface comprising a position sensor having an active range including the selectable mode icons of the book well;
- control electronics in the housing assembly, the control electronics comprising:
    - non-volatile memory having therein instructions associated with the selectable mode icons in the book well; and
    - a controller in electrical communication with the electronic user interface, the controller configured
        - a) to operate in accordance with the instructions associated with the selectable mode icon in the book well,
        - b) to determine a position of the selector when the selector is within the active range of the position sensor,
        - c) to recognize a selection by the selector of the selectable mode icons in the book well, and
        - d) to send to the electronic user interface a signal associated with the selection.

33. An interactive electronic device for receiving a book associated with an interactive electronic learning system responsive to a selector, the book having selectable content and an arrangement of selectable mode icons, the device comprising:
- a housing assembly having a book well configured to receive the book;
- an electronic user interface in the housing assembly, the electronic user interface comprising a position sensor and a visible signal generator, the position sensor having an active range including the selectable content and the arrangement of selectable mode icons when the book is in the book well, wherein the visible signal generator is an arrangement of light emitting diodes and each of the selectable mode icons of the book is in registry with one of the light emitting diodes when the book is in the book well;
- control electronics in the housing assembly, the control electronics comprising:
    - non-volatile memory having therein instructions associated with the selectable content and the selectable mode icons; and
    - a controller in electrical communication with the electronic user interface, the controller configured
        - a) to operate in accordance with the instructions in the non-volatile memory,
        - b) to determine a position of the selector when the selector is within the active range of the position sensor,
        - c) to recognize a first selection by the selector of one of the selectable mode icons and send to the visible signal generator a first signal corresponding to the first selection, and
        - d) to recognize a second selection by the selector of the selectable content and send to the electronic user interface a signal associated with the second selection, wherein the visible signal generator is an arrangement of light emitting diodes and each of the selectable mode icons is in registry with one of the light emitting diodes.

34. An interactive electronic learning device for receiving a book associated with an interactive electronic learning system responsive to a selector, the book having a predetermined orientation, a two-page spread formed by a first page and a second page connected to the first page by a binding attached to a spine, the two-page spread having opposed side edges distal to the binding, each of the opposed side edges having a setback upper portion, a page identifier, selectable content, a first arrangement of selectable mode icons on the two-page spread, the device comprising:
- a housing assembly having a base with a base-recess and a cover with a cover-recess;
- a hinge assembly connecting the base to the cover, the hinge assembly comprising a first hinge and a second hinge spaced from the first hinge, the first and second hinges having an axis of rotation spaced from the base-recess edge and the cover-recess edge;
- a book well formed by the base-recess and the cover-recess, the book well having sidewalls generally conforming to the two-page spread, the sidewalls configured to receive the book when the book is in the predetermined orientation, a portion of each sidewall in registry with the setback upper portion of the two-page spread having a sidewall setback configured, in conjunction with the setback upper portion of the two-page spread, to facilitate access for page turning;
- a book mounting assembly having a first mounting element integral with the first hinge and a second mounting element integral with the second hinge, the first and second mounting elements configured to releasably retain the book in the book well;
- a physical user interface in the book well, the physical interface comprising a second arrangement of selectable mode icons and an arrangement of selectable indicia;
- an electronic user interface in the housing assembly, the electronic user interface comprising a position sensor and an arrangement of light emitting diodes, the position sensor having an active range including the selectable content of the book when the book is in the book well, each of the selectable mode icons is in registry with one light emitting diode of the arrangement of light emitting diodes;
- a page identification sensor is in the housing assembly; and
- control electronics in the housing assembly, the control electronics comprising:

non-volatile memory having therein instructions associated with each of the selectable mode icons of the first and second arrangements of selectable mode icons and data associated with the selectable indicia and the selectable content; and a controller in electrical communication with the electronic user interface, the position sensor, and the page identification sensor, the controller configured a) to operate in accordance with the instructions in the non-volatile memory, b) to determine a position of the selector when the selector is within the active range of the position sensor, c) to recognize the page identifier;

d) to recognize a first selection by the selector of one of the selectable mode icons of the first and second arrangements of selectable mode icons and to energize the light emitting diode in registry with the first selection, and e) to recognize a second selection by the selector of the selectable content of the book or the selectable indicia of the book well and send to the electronic user interface a signal associated with the second selection.

35. The device according to claim 34, wherein the position sensor is configured to sense the location of a finger when the finger is in the active range of the position sensor.

36. An interactive electronic device comprising:

a housing assembly having a portion of a surface configured to receive a print medium with selectable content;

a physical user interface on the portion of the surface, the physical user interface comprising a plurality of selectable indicia;

an electronic user interface in the housing assembly, the electronic user interface comprising a sensor having an active range including the arrangement of selectable indicia, and the selectable content of the print medium when the print medium is on the portion of the surface; and control electronics in the housing assembly, the control electronics comprising:

memory having therein instructions associated with the selectable content of the print media and the plurality of selectable indicia; and a controller in electrical communication with the electronic user interface, the controller configured a) to operate in accordance with the instructions in the memory, and b) to recognize a selection by a selector of one of the plurality of selectable indicia or the selectable content of the print media when the print medium is on the portion of the surface.

37. The interactive electronic device according to claim 36, wherein the print medium is a book and the portion of the surface is a book well.

38. The interactive electronic device according to claim 36, wherein the memory comprises removable memory.

39. The interactive electronic device according to claim 36, wherein the sensor is configured to detect the presence a finger within the active range of the sensor.

40. The interactive electronic device according to claim 36, wherein the selector is a stylus.

41. The interactive electronic device according to claim 36, wherein the plurality of selectable indicia comprises language symbols.

42. The interactive electronic device according to claim 36, wherein the plurality of selectable indicia comprises an arrangement of letters.

43. The interactive electronic device according to claim 42, wherein the arrangement of letters are arranged alphabetically.

44. The interactive electronic device according to claim 36, wherein the plurality of selectable indicia comprises letter pairs, each pair comprising an upper case representation of a letter and a lower case representation of the letter.

45. The interactive electronic device according to claim 36, wherein the plurality of selectable indicia comprises numbers.

46. The interactive electronic device according to claim 36, wherein the plurality of selectable indicia comprises a symbol associated with music.

47. The interactive electronic device according to claim 36, wherein the plurality of selectable indicia comprises a plurality of mode icons, each representing a mode of operation of the control electronics and selection of one of the plurality of mode icons causes the control electronics to operate in the corresponding mode of operation.

48. The interactive electronic device according to claim 36, wherein the selectable content comprises a graphic.

49. The interactive electronic device according to claim 36, wherein the selectable content comprises a word.

50. The interactive electronic device according to claim 36, wherein the selectable content comprises a letter.

51. The interactive electronic device according to claim 36, wherein the selectable content comprises a plurality of mode icons, each representing a mode of operation of the control electronics and selection of one of the plurality of mode icons causes the control electronics to operate in the corresponding mode of operation.

52. The interactive electronic device according to claim 36, wherein the controller is further configured to send to the electronic user interface a signal associated with the selection.

53. The interactive electronic device according to claim 36, wherein the electronic user interface generates a user perceivable signal associated with the selection.

54. The interactive electronic device according to claim 36, wherein the control electronics is configured to operate in a reading mode.

55. The interactive electronic device according to claim 54 wherein the reading mode teaches a name of a letter in an alphabet.

56. The interactive electronic device according to claim 54, wherein the reading mode teaches a sound of a letter in an alphabet.

57. The interactive electronic device according to claim 54, wherein the reading mode teaches an order of a sequence of letters in an alphabet.

58. The interactive electronic device according to claim 54, wherein the reading mode teaches spelling.

59. The interactive electronic device according to claim 54, wherein the reading mode teaches a pronunciation of a word.

60. The interactive electronic device according to claim 36, wherein the control electronics is configured to operate in an activity mode.

61. The interactive electronic device according to claim 60, wherein the activity mode teaches shapes.

62. The interactive electronic device according to claim 60, wherein the activity mode teaches a visual discrimination skill.

63. The interactive electronic device according to claim 60, wherein the activity mode teaches at least one of rhyming, matching and patterning.

64. The interactive electronic device according to claim 60, wherein the activity mode requires compound selection.

65. The interactive electronic device according to claim 60, wherein the activity mode teaches counting.

66. The interactive electronic device according to claim 60, wherein the activity mode teaches music skills.

67. The interactive electronic device according to claim 36, wherein the instructions correspond to a template.

68. The interactive electronic device according to claim 67, wherein the template provides a question regarding one of the plurality of indicia and provides a response based on the selection.

\* \* \* \* \*